(12) United States Patent
Yushin et al.

(10) Patent No.: US 11,931,810 B2
(45) Date of Patent: Mar. 19, 2024

(54) METALLIC NANOWIRES AND METHODS THEREOF

(71) Applicant: Sila Nanotechnologies, Inc., Alameda, CA (US)

(72) Inventors: Gleb Yushin, Atlanta, GA (US); Wenqiang Hu, Beijing (CN); Samik Jhulki, Emeryville, CA (US); Wenbin Fu, Atlanta, GA (US); Kostiantyn Turcheniuk, Oakland, CA (US)

(73) Assignees: Sila Nanotechnologies, Inc., Alameda, CA (US); Georgia Tech Research Corporation, Atlanta, GA (US)

( * ) Notice: Subject to any disclaimer, the term of this patent is extended or adjusted under 35 U.S.C. 154(b) by 25 days.

(21) Appl. No.: 17/656,065

(22) Filed: Mar. 23, 2022

(65) Prior Publication Data

US 2022/0305555 A1   Sep. 29, 2022

Related U.S. Application Data

(60) Provisional application No. 63/167,281, filed on Mar. 29, 2021.

(51) Int. Cl.
| | |
|---|---|
| *B22F 9/22* | (2006.01) |
| *B22F 1/054* | (2022.01) |
| *B22F 1/062* | (2022.01) |
| *B22F 9/20* | (2006.01) |
| *B82Y 30/00* | (2011.01) |
| *B82Y 40/00* | (2011.01) |
| *C07F 3/06* | (2006.01) |
| *C22C 18/00* | (2006.01) |

(52) U.S. Cl.
CPC .............. *B22F 9/22* (2013.01); *B22F 1/0547* (2022.01); *B22F 1/062* (2022.01); *B22F 9/20* (2013.01); *C07F 3/06* (2013.01); *C22C 18/00* (2013.01); *B22F 2301/30* (2013.01); *B22F 2304/05* (2013.01); *B82Y 30/00* (2013.01); *B82Y 40/00* (2013.01)

(58) Field of Classification Search
CPC .......... B22F 1/0547; B22F 1/062; B22F 9/20; B22F 9/22; B22F 2301/30; B22F 2304/05; B82Y 30/00; B82Y 40/00; C22C 18/00; C22C 18/02; C22C 18/04; C07F 3/06; H01L 21/02603; Y10S 977/762
See application file for complete search history.

(56) References Cited

PUBLICATIONS

Lei et al. "Transformation of bulk alloys to oxide nanowires," Jan. 20, 2017, Science, vol. 355, Issue 6322, pp. 267-271 (Year: 2017).*

* cited by examiner

*Primary Examiner* — Samir Shah
*Assistant Examiner* — Dean Mazzola
(74) *Attorney, Agent, or Firm* — Muncy, Geissler, Olds & Lowe, P.C.; Daniel Podhajny

(57) ABSTRACT

Aspects relate to method of zinc-comprising nanowire fabrication, the method comprising forming a starting material comprising zinc metal or zinc metal alloy and at least one reactive metal, and exposing the starting material to one or more alcohols to obtain a reaction product comprising zinc-comprising nanowires, wherein the at least one reactive metal is more reactive than zinc to the one or more alcohols.

19 Claims, 15 Drawing Sheets
(1 of 15 Drawing Sheet(s) Filed in Color)

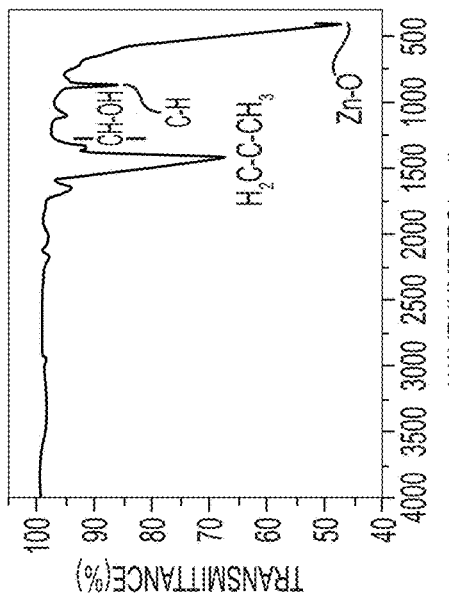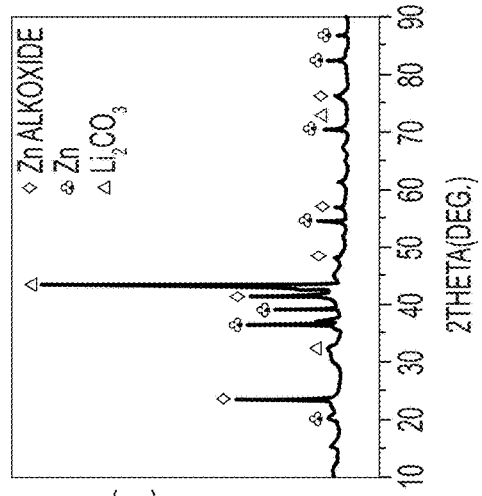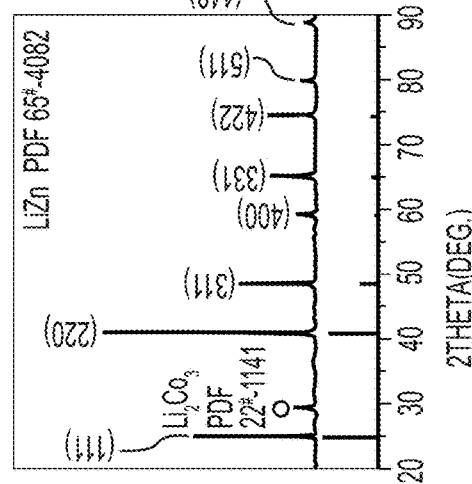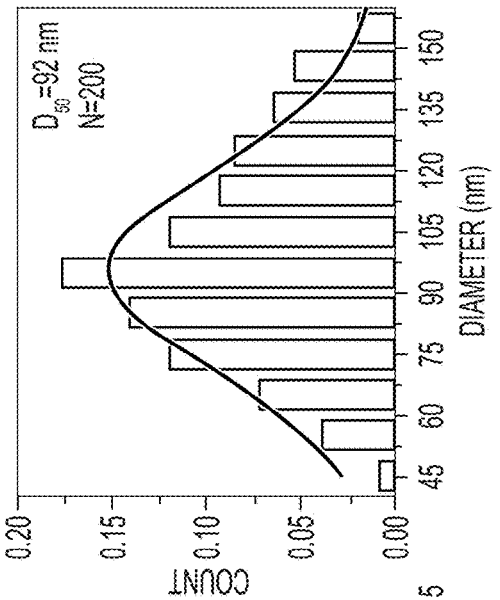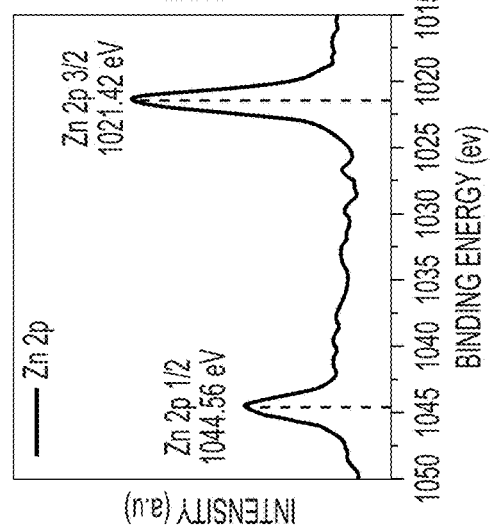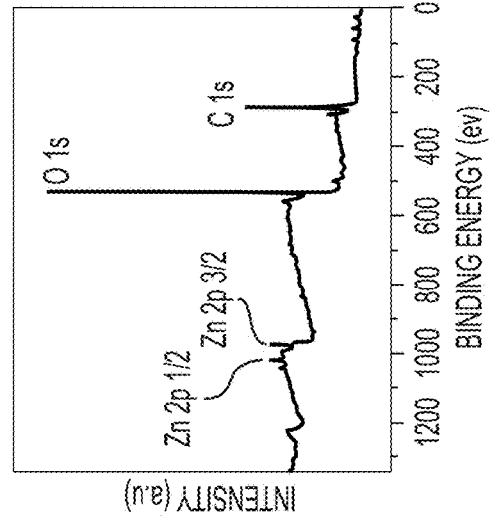

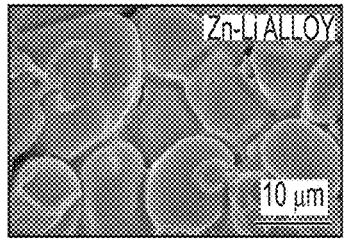 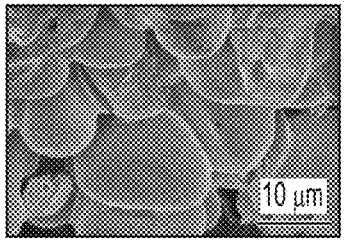 
FIG. 2(a)   FIG. 2(b)   FIG. 2(c)
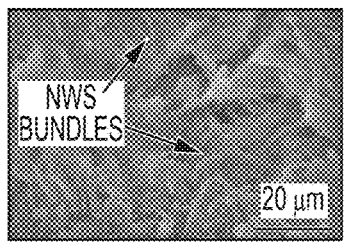 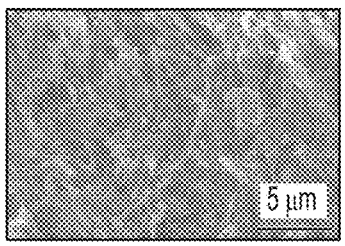 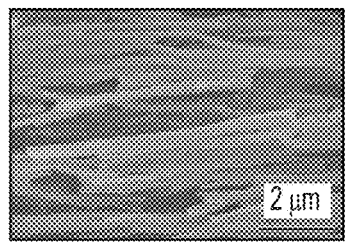
FIG. 2(d)   FIG. 2(e)   FIG. 2(f)
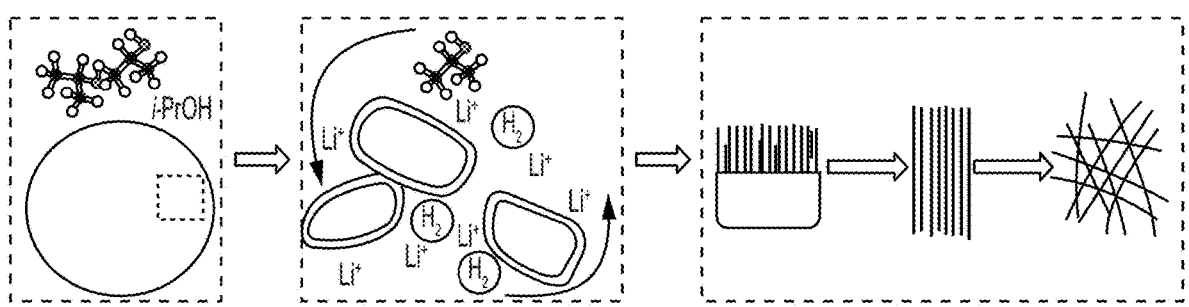
FIG. 2(g)

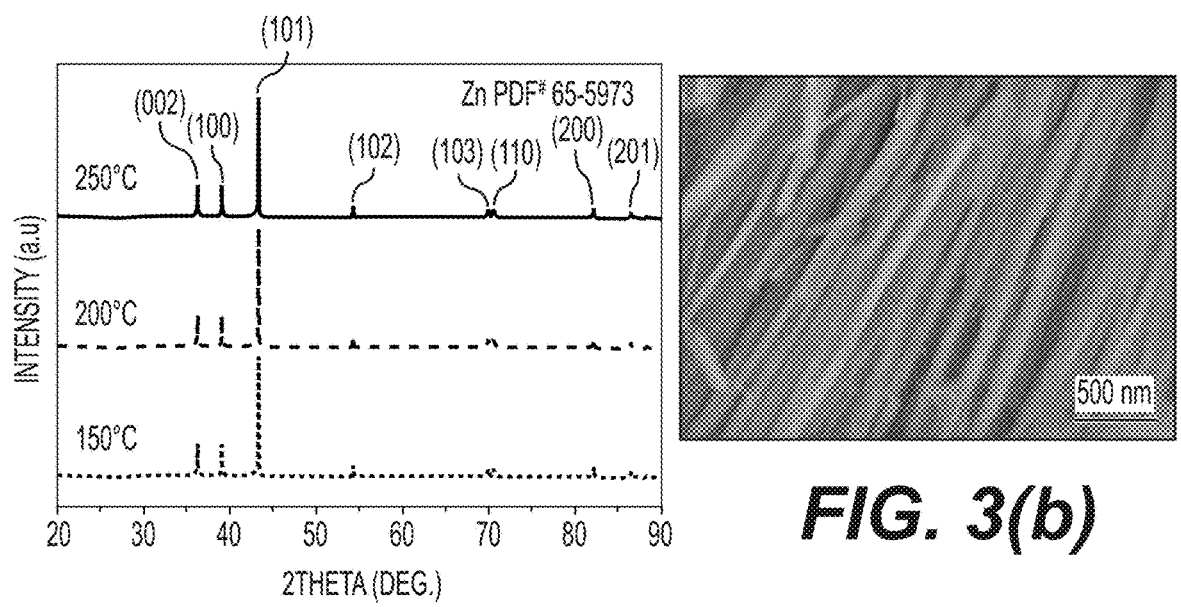
FIG. 3(a)
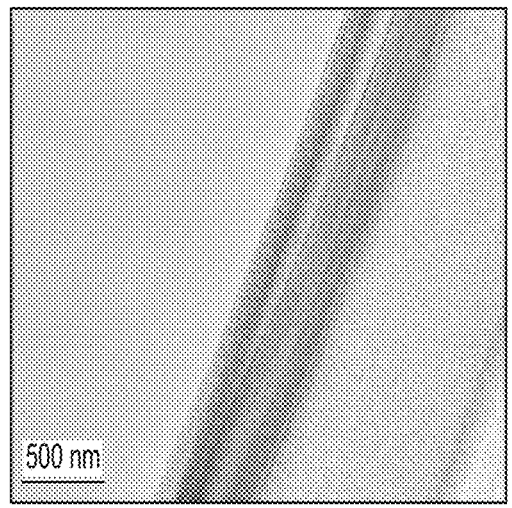
FIG. 3(c)
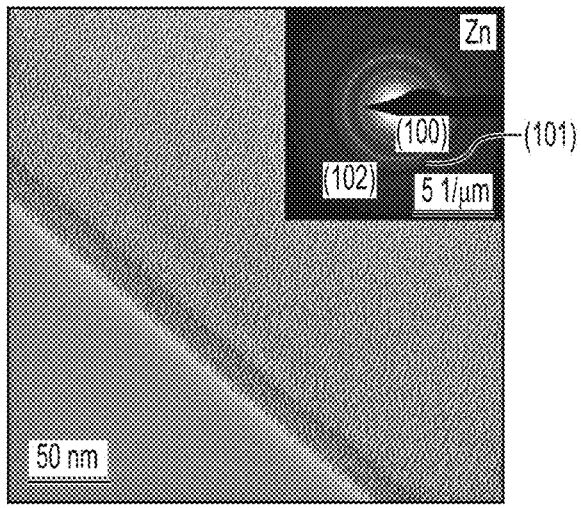
FIG. 3(d)
FIG. 3(b)

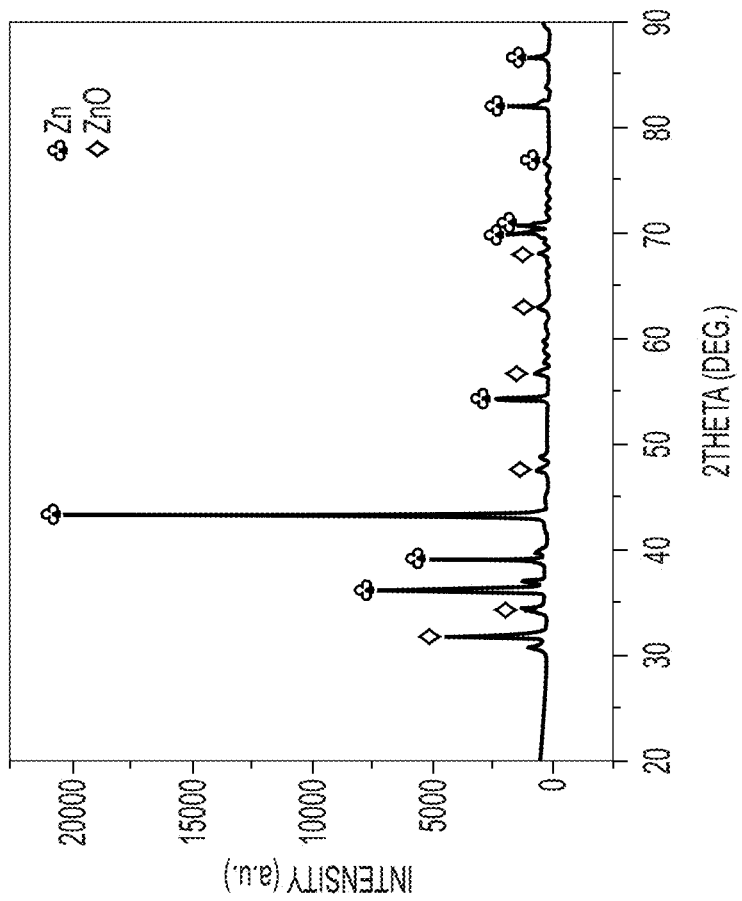
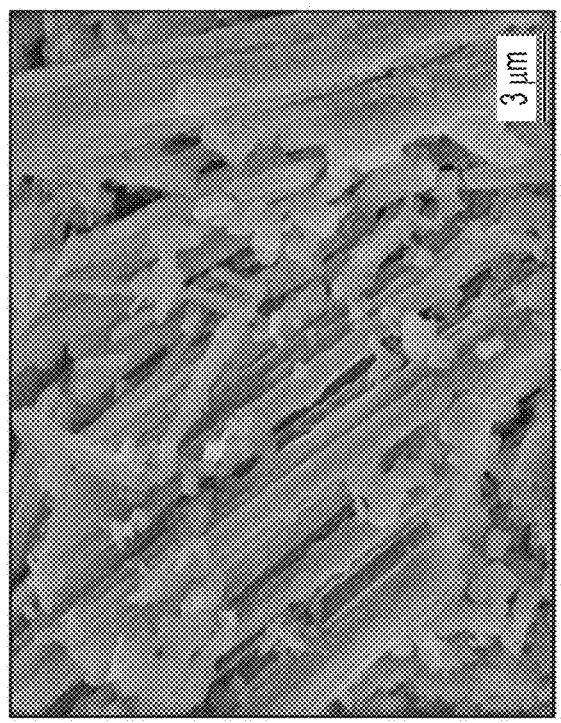
FIG. 11(a)
FIG. 11(b)

METALLIC NANOWIRES AND METHODS THEREOF

CROSS-REFERENCE TO RELATED APPLICATIONS

The present Application for Patent claims the benefit of U.S. Provisional Application No. 63/167,281, entitled "METALLIC NANOWIRES AND METHODS THEREOF," filed Mar. 29, 2021, assigned to the assignee hereof, and expressly incorporated herein by reference in its entirety.

BACKGROUND

Field

Aspects of the present disclosure relates generally to metallic nanowires and methods thereof.

Background

Long one-dimensional (1D) objects such as robust cables and conducting wires have existed for centuries and played pivotal roles in progressive transformation into modern human civilization. Such interests in 1D objects have transcended into 1D nanomaterials such as nanowires (NWs), nanofibers, nanowhiskers, nanotubes and nanorods. In particular, leveraging their structural anisotropy and high aspect ratio, 1D nanomaterials exhibit a host of electronic, mechanical, and optical properties, which are not available in their bulk counterparts. Thus, 1D nanomaterials have been envisioned as promising candidates for a variety of applications from electronic devices to healthcare. As one of the most important classes of 1D nanomaterials, purely metallic and electrically conductive NWs have attracted growing interest due to their promise as transparent electrodes, flexible/stretchable sensors and/or electrocatalytic systems in a wide range of technologically relevant applications, such as wearable electronics, biomedical devices, lithium-ion batteries and other energy storage devices.

Among the fascinating metallic 1D nanomaterials family, most research attentions have been devoted to gold (Au) and silver (Ag) NWs, which despite their attractive electronic properties may have a limited use due to their high cost. However, lower cost metallic NWs are hard to make. A simple, scalable, and cost-effective synthesis route of non-precious metal NWs is heretofore unknown, which is unfortunate due to their potential impact in the future electronics, medical, renewable energy, environmental and other industries.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, method of zinc-comprising nanowire fabrication comprises (a) providing a starting material comprising zinc metal or zinc metal alloy and at least one reactive metal, and (b) exposing the starting material to one or more alcohols to obtain a reaction product comprising zinc-comprising nanowires, wherein the at least one reactive metal is more reactive than zinc to the one or more alcohols.

In another aspect, a device comprises a plurality of porous zinc-comprising nanowires, wherein: a specific surface area of at least one of the porous zinc-comprising nanowires is in a range from about 5 to about 500 $m^2/g$, and an aspect ratio of at least one of the zinc-comprising nanowires is in a range from about 1:10 to about 1:100,000.

In an aspect, a method of zinc-comprising nanowire fabrication includes (a) forming a zinc metal alloy with at least one other metal at a given atomic fraction of zinc; and (b) exposing the zinc metal alloy to one or more alcohols at a given temperature and a given pressure to produce zinc-comprising nanowires.

In some aspects, the method further includes (c) separating the zinc-comprising nanowires from a residual liquid.

In some aspects, the method further includes (d) optionally exposing the zinc-comprising nanowires to a chemically reducing environment (a gaseous or liquid environment comprising a chemical reducing agent).

In some aspects, the chemical reducing agent includes lithium aluminium hydride ($LiAlH_4$), sodium bis(2-methoxyethoxy)aluminium hydride ($NaAlH_2(OCH_2CH_2OCH_3)_2$), hydrogen (including hydrogen comprising gas mixtures), lithium borohydride ($LiBH_4$), sodium borohydride ($NaBH_4$), iron sulfate, or a combination thereof.

In some aspects, the at least one other metal comprises Li.

In some aspects, the given atomic fraction of zinc in the zinc metal alloy is selected to be below about 50 at. %.

In some aspects, one or more alcohols includes 1-propanol ($C_3H_7OH$), 2-propanol ($C_3H_7OH$), or a combination thereof.

In some aspects, the given pressure is in the range from about 0.1 atm. to about 20 atm.

In some aspects, the given temperature is in the range from about 0° C. to about 100° C.

In some aspects, the zinc-comprising nanowires comprise a zinc metal nanowire or a zinc metal alloy nanowire or a combination thereof.

The method of claim 1, wherein the zinc-comprising nanowires comprise a porous zinc-comprising nanowire.

In some aspects, a specific surface area of the zinc-comprising nanowire is in the range from about 5 to about 500 $m^2/g$.

In some aspects, an aspect ratio of the zinc-comprising nanowire is in the range from about 1:10 to about 1:100,000.

Other objects and advantages associated with the aspects disclosed herein will be apparent to those skilled in the art based on the accompanying drawings and detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIG. 1(a)-(k) illustrate (a) real-time photographs of the dealloying reaction of Zn-li alloy in the iso-propanol, (b) and (c) X-ray diffraction (XRD) patterns of fabricated LiZn alloy and resulted nanowires after dealloying, (d) Fourier Transformed Infrared Spectroscopy (FTIR) analysis of dealloyed NWs sample, (e) and (f) wide-scan and Zn 2p X-ray photoelectron spectroscopy (XPS) spectrum analysis of dealloyed NWs, (g) image analysis of nanowire diameter distribution with the average diameter, D50, and number of measurement in the reported samples, (h) scanning electron microscopy (SEM) image of the nanowire bundles and (i) the top view SEM image showing the tips of the nanowires, (j) split nanowires morphology, (k) aligned nanowires at higher magnification.

FIGS. 2(a)-(g) illustrate a reaction process of NW formation, including (a) SEM micrographs of initial grain structure of the as-produced Zn—Li alloy; (b-e) the formation process of aligned nanowire forest on the surface of LiZn particles after exposure to dry isopropanol at room temperature for 10 min, 1 h, 5 h and 24 h, respectively; (f) misaligned redispersed nanowires produced after completion of the conversion reaction and washing; (g) schematic representation of the nanowire formation revealing two different stages.

FIGS. 3(a)-(d) illustrate formation of Zn NWs via thermal reduction of the mixed Zn and Zn alkoxide NWs in $H_2$—Ar at 150-250° C. for 1 h, including: (a) XRD profile of as-produced Zn NWs from annealing at 150° C., 200° C. and 250° C., respectively; (b) SEM micrograph; (c) low-resolution TEM image; (d) high-resolution TEM image with selected area diffraction (SAED) pattern shown in inset.

FIGS. 11(a)-(b) illustrate[[s]] XRD patterns and SEM morphology, respectively, of NWs after annealing at 400° C. for 1 h in $H_2$—Ar.

DETAILED DESCRIPTION

Figure 1A:
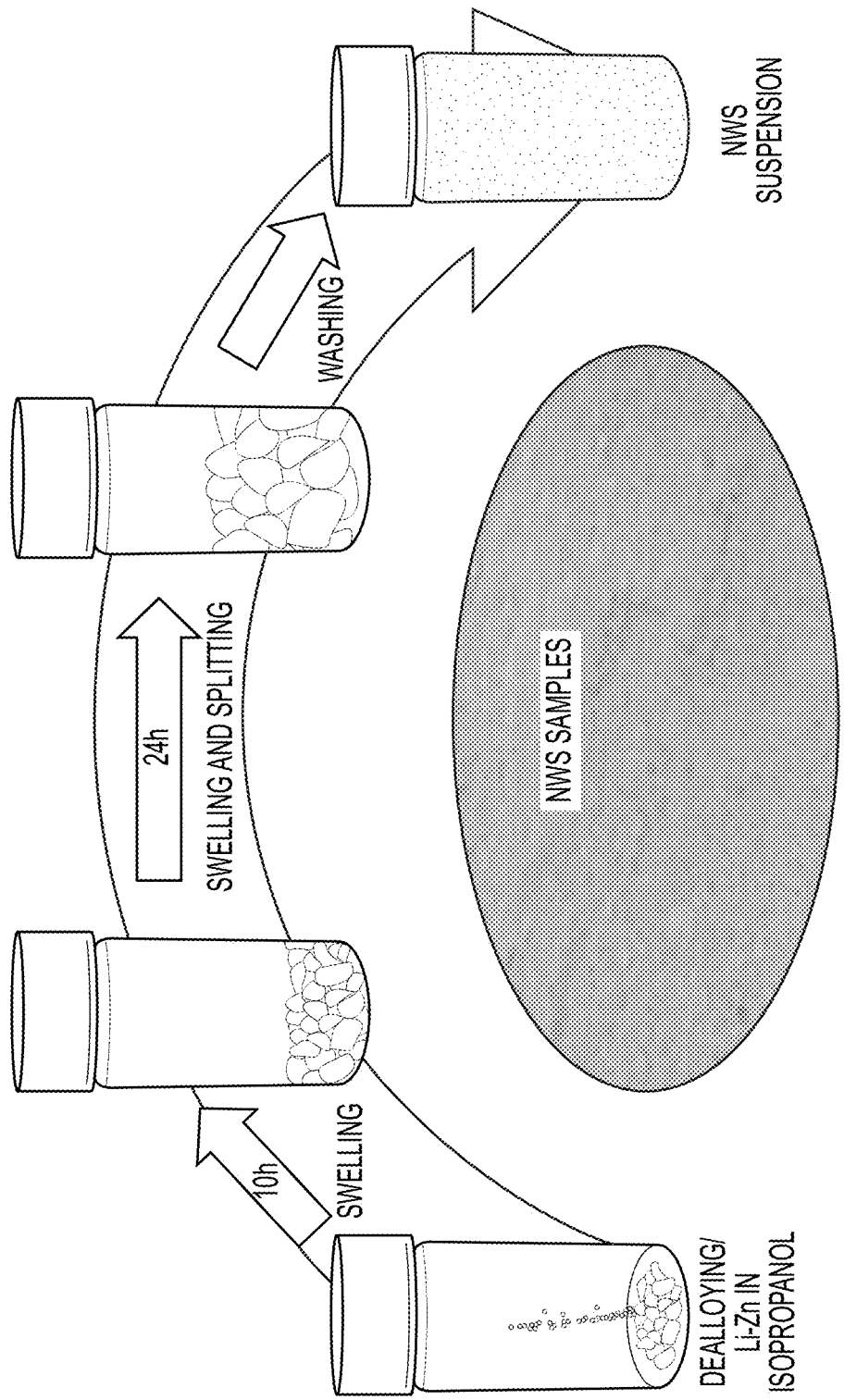

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from about —120° C. to about —60° C. encompasses (in ° C.) a set of temperature ranges from about —120° C. to about —119° C., from about —119° C. to about —118° C., . . . from about —61° C. to about —60° C., as if the intervening numbers (in ° C.) between —120° C. and —60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. In yet another example, a numerical range with upper and lower bounds defined at different levels of precision shall be interpreted in increments corresponding to the bound with the higher level of precision. For example, a numerical percentage range from 30.92% to 47.4% (i.e., levels of precision in units or increments of hundredths and tenths, respectively) encompasses (in %) a set of [30.92, 30.93, 30.94, . . . , 47.39, 47.40], as if 47.4% (tenths) was recited as 47.40% (hundredths) and as if the intervening numbers between 30.92 and 47.40 in units or increments of hundredths were expressly disclosed.

While the disclosure often focuses on zinc metal NWs, as zinc is a well-known, low-cost (e.g., ~2.8 \$/kg in 2021), highly conductive (e.g., being the $6^{th}$ most conductive metal with a conductivity of $\sim 16.6 \cdot 10^6$ S/m), relatively abundant (e.g., being the $24^{th}$ most abundant element), moderate density (e.g., ~7.1 g/cm$^3$), relatively hard, relatively corrosion-resistant (e.g., favorably compared, for example, with iron or copper), bio-compatible and bio-degradable metal, it shall be understood that NWs from other metals or their various mixtures (e.g., zinc, silver, gold, magnesium, tin, etc.) may also be prepared using similar procedures and chemicals (e.g. from alloys' reaction with suitable alcohols, followed by chemical reduction) and process conditions when desired. In some designs, these or other metals or metal precursors (e.g., metal alkoxides or other metal-organic compounds or metal salts) may be added to (or coated around) the zinc-comprising NWs to form alloys in subsequent stages (e.g., after the reduction or heat-treatments). In some designs, such alloys may comprise one, two, three of more of the following metals: silver, gold, magnesium, tin, copper, antimony, bismuth, iron, cobalt, nickel, sodium, tellurium, aluminum, titanium, among others.

While aspects of the disclosure as described below often focuses on pure zinc metal NWs, it should be understood that a similar methodology may be applicable for the formation of zinc metal alloy NWs. In some designs, such alloy NWs may comprise about 75.0-99.9 at. % zinc (e.g., about 75-85 at. % or about 85-90 at. % or about 90-95 at. % or 95-99.9 at. % zinc). Such zinc metal alloy NWs may additionally comprise one, two, three or more of the following metals: copper (Cu), aluminum (Al), magnesium (Mg), nickel (Ni), titanium (Ti), among others.

Metallic zinc (Zn) NWs, with high electronic conductivity, special thermoelectric and magnetoresistance as well as superconducting properties, can potentially replace the costly Au or Ag NWs for a variety of applications including flexible displays, touch panels, and sensors. In addition, the lower cost of Zn 1D nanomaterials, such as Zn NWs, may enable their use in other more cost-sensitive applications, such heaters, energy conversion and storage, electrical shielding, conductive fabrics, conductive additives in composites, paints, conductive inks, or battery electrodes, to name a few. However, a major bottleneck in the widespread commercial use of Zn NWs is their complicated, expensive, and elaborate synthesis requirements, which often rely on costly precursors or instrumentations, sacrificial templates and/or catalysts, harsh reaction conditions (high temperature and/or pressure), and low reaction throughput. In addition, Zn NWs reported by various often suffer from being interconnected to each other (i.e., difficult to separate), not being straight and not having sufficiently high aspect ratio desired for many applications. Finally, various studies related to Zn NW fabrication suffer from inability to prepare sufficiently long or sufficiently high aspect ratio Zn NWs. These issues can totally offset the benefits of relatively low cost of Zn compared to Au or Ag for some applications.

As noted above, a major bottleneck in the widespread commercial use of Zn 1D nanomaterials, such as Zn NWs, is their complicated, expensive, and elaborate synthesis requirements, which often rely on costly precursors or instrumentations, sacrificial templates and/or catalysts, harsh reaction conditions (high temperature and/or pressure), and low reaction throughput. These issues can totally offset the benefits of relatively low cost of Zn compared to Au or Ag. A simple, scalable, and cost-effective synthesis route of high-quality, long, high aspect ratio Zn NWs is heretofore unknown, which is unfortunate due to their potential impact in the future electronics, medical, renewable energy, environmental and other industries.

In some designs, bulk bimetallic alloys may be transformed into metalorganic NWs by dissolution of the more reactive metal in an organic alcohol (e.g., methanol, ethanol, and propanol) at near-room temperature and near-atmospheric pressure. This route is convenient, requires no special skills or instruments, or even use of any catalyst. Mechanistically, the growth of NWs depends on strain energy minimization at the boundary of chemical transformation front and the NW diameter is determined by the balance of strain energy and surface energy. Leveraging on this strategy, metalorganic NWs based on Al, Mg and/or Cu, can be post-synthetically oxidized to insulative ceramic metal-oxide NWs by annealing in air.

Aspects of the disclosure are directed in part to a similar strategy for synthesis of conductive Zn metal NWs. In particular, the inventors are believed to have performed the first successful synthesis of substantially pure Zn NWs by two-stage process involving dissolution of Zn—Li alloy in an alcohol, followed by its chemical reduction. Through a systematic exploration of reaction conditions and alloy compositions, the nuances of alloy reactivity and the growth mechanism of organo-Zn NWs for the dealloying stage are described below in detail. The thermal, spectroscopic, and microstructural characterizations of organo-Zn and Zn NWs are also described below in detail. The effects of annealing conditions in the conversion of organo-Zn NWs into Zn NWs are also described below in detail.

Zn—Li Alloy Characterizations

Figure 4A:
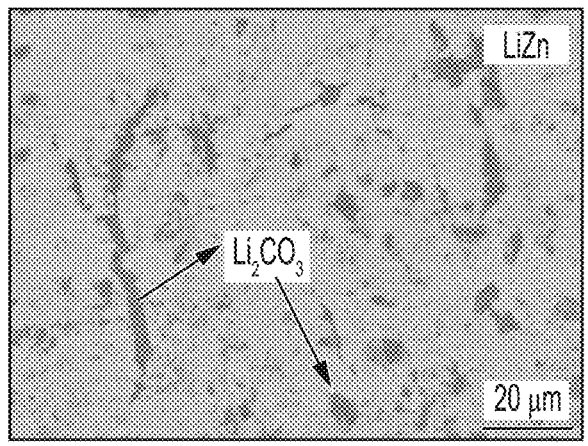
FIGS. 4(a)-(d) illustrate scanning electron microscopy (SEM) micrographs(a) and EDX mapping analysis (b-d) of the LiZn alloy.
Figure 4B:
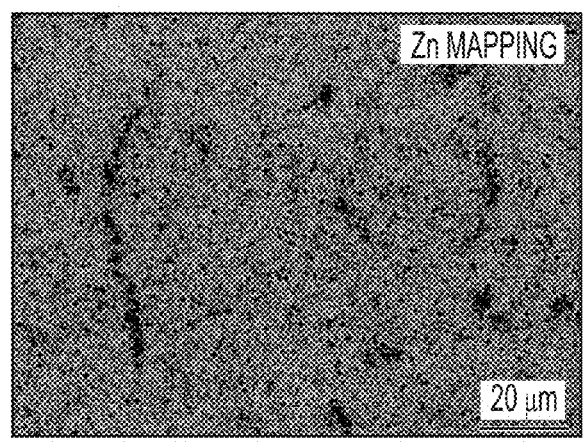
Figure 4C:
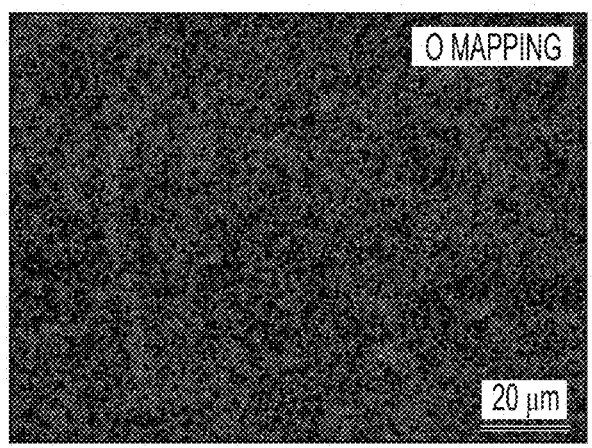
Figure 4D:
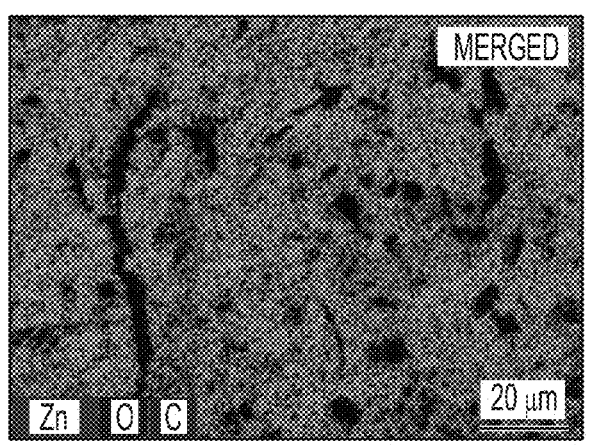

In some designs, based on the binary Zn—Li phase diagram, mixtures of Zn and Li with different atomic percentage ratios may be heated at a certain temperature to obtain Zn—Li alloys (see Experimental Details section below for more details). FIG. 1(b) shows a representative X-ray diffraction (XRD) pattern of the as-synthesized $Zn_{0.3}Li_{0.7}$ alloy. The diffraction peaks at 2θ=24.7°, 40.9°, 48.4°, 50.7°, 59.2°, 65.17°, 74.5°, 79.9° and 88.7° correspond to the (111), (220), (311), (400), (331), (422), (511) and (440) planes, respectively, of pure LiZn alloy in a cubic phase (PDF:65#-4082, space group: Fd-3m (227)). The peak at 29.25° can be assigned to $Li_2CO_3$ (PDF 22#-1141) impurity, which likely originates from a side reaction involving graphite crucible, liquid Li (in a molten ZnLi matrix) and oxygen. FIG. 4(a) illustrates the SEM surface morphology of the as-fabricated $Zn_{0.3}Li_{0.7}$ alloy, which reveals an expected uniform distribution of Zn, consistent with a pure phase of the alloy (e.g., see FIG. 4(b)). However, 'O' atoms could also be seen throughout with more intensities in certain dark colored regions (e.g., see FIGS. 4(a), 4(c), and 4(d)). The dark colored regions in FIGS. 4(a), 4(c), and 4(d) indicate the presence of lighter elements such as Li. Thus, combining information from SEM-EDS (concurrence of high proportions of Li and O in the dark regions) and XRD analyses, it is likely that the dark colored regions in FIGS. 4(a), 4(c), and 4(d) are enriched with $Li_2CO_3$. Further, the $Li_2CO_3$ content increases with the increment of Li proportion in ZnLi alloys; however, the presence of $Li_2CO_3$ does not affect the subsequent delithiation and NWs growth.

Figure 5A:
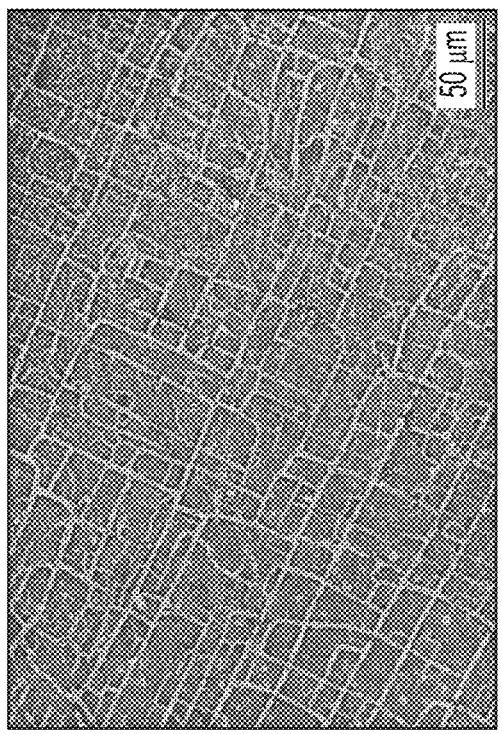
FIGS. 5(a)-(b) illustrate SEM morphology after etching revealing the regular rectangle-shape grain of LiZn alloy.
Figure 5B:
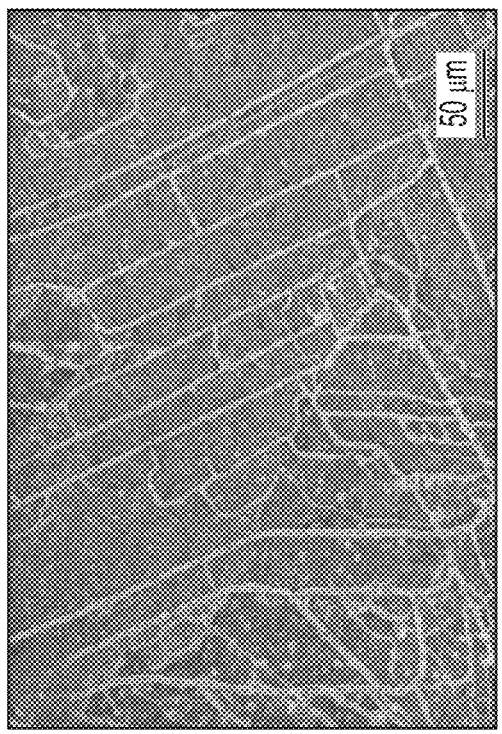
Figure 6B:
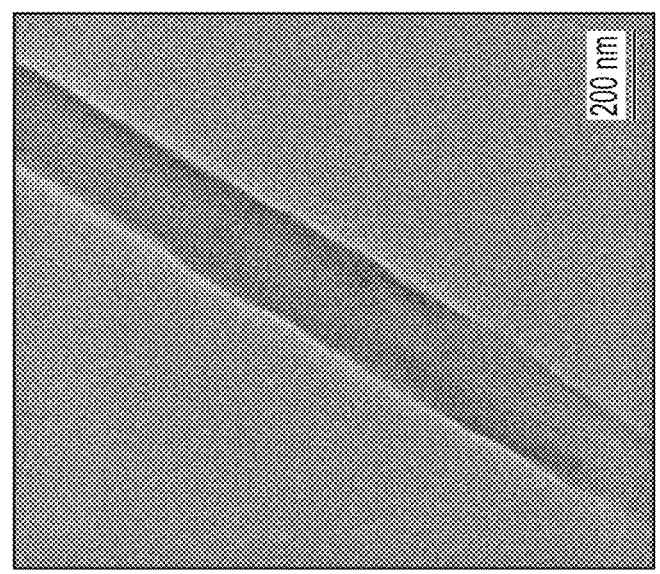
FIGS. 6(a)-(b) illustrate high-resolution transmission electron microscopy (TEM) of the NWs after dealloying, whereby the electron diffraction pattern of the nanowires (SAED) indicates NWs may decompose under the TEM beam with high voltage.
Figure 6A:
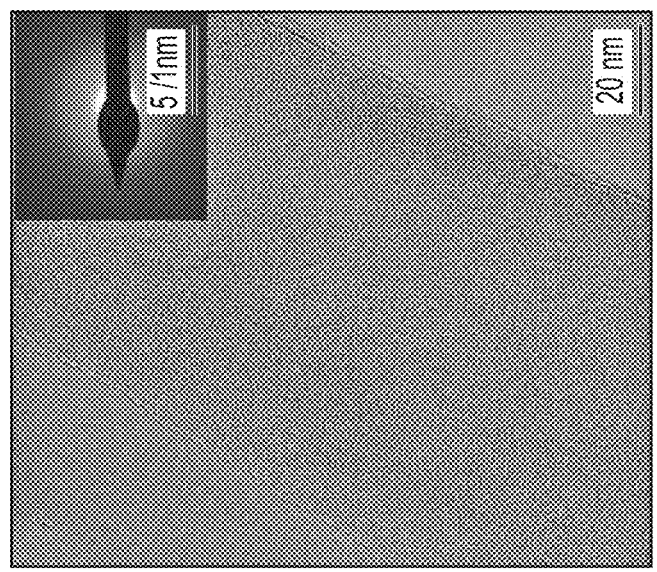

In some designs, the lengths of Al/Mg-alkoxide NWs may be related to (e.g., tuned by or controlled by) the initial grain sizes of the bulk Al—Li and Mg—Li alloys. Likewise, in some designs, lengths of Zn-alkoxide NWs may be related to (e.g., tuned by or controlled by) the initial grain sizes of the bulk Zn—Li alloys. To reveal the grain morphology and size, the as-synthesized $Zn_{0.3}Li_{0.7}$ alloys were polished and subsequently etched using an acidic ethanol solution (5% conc. HCl, v/v). SEM images of the etched surface of $Zn_{0.3}Li_{0.7}$ alloy are shown in FIG. 5(a)-(b), which reveals that the grains are of a rectangular shape with grain length of ca. 50-100 μm and width of ca. 20-30 μm. The regularities in grain shape and sizes of the bulk alloys indicate that the generated NWs from these alloys are likely to be uniform in sizes and shapes, vide infra.

Composition of ZnLi Alloy for Dealloying

Li-bearing alloys (such as AlLi and MgLi) may delithiate when exposed to dry alcohols (e.g., methanol, ethanol, isopropanol, etc.) at ambient and high temperatures (e.g., about 20° to about 70° C.). Such reactions may lead to the formation of soluble Li-alkoxides and insoluble metal-organic polymeric compounds of NWs-like morphology with the other metal ion (Al or Mg). Likewise, in some designs, a similar reaction may also be used for Zn—Li alloys, which may lead to the formation of Zn-alkoxide based NWs. As precursors of the NWs, in some designs, the composition(s) and microstructure(s) of the as-synthesized ZnLi alloys play a significant role in the NWs growth (see Experimental Details section below for more details). For example, at below about 60% atomic composition of Li in ZnLi alloys, the dealloying reactions may be rather sluggish in isopropanol at atmospheric pressure and room temperature (little-to-no visible $H_2$ gas evolution) and may not lead to the formation of desired NWs under different explored conditions, as shown in Table 1:

TABLE 1

| Zn—Li alloy at. % | Dealloying occurrence in i-PrOH | Morphology in i-PrOH | Morphology In MeOH and EtOH |
|---|---|---|---|
| $Zn_{0.6}Li_{0.4}$ | No | Bulk alloy | Porous Zn and ZnLi |
| $Zn_{0.5}Li_{0.5}$ | No | Bulk alloy | Porous Zn and ZnLi |
| $Zn_{0.4}Li_{0.6}$ | Yes | NWs | Porous Zn and ZnLi micron-sized rod |
| $Zn_{0.3}Li_{0.7}$ | Yes | NWs | — |
| $Zn_{0.2}Li_{0.8}$ | Yes | NWs | — |
| $Zn_{0.1}Li_{0.9}$ | Yes | NWs | — |

On the other hand, at about Li at. 60% or higher in ZnLi alloys, the dealloying reactions reliably afforded NWs within about 24-48 hours, suggesting that the threshold reactivity for the NWs formations is dominated when Li is present at least about 60 at. % in the ZnLi alloys in some applications, as shown in Table 1. In some designs, the grain sizes are largely independent of the compositions of the ZnLi alloys, which suggests that grain sizes are primarily relevant for sizes of the NWs and have little to do with the reactivities of the alloys.

In principle, lower Li % may be beneficial for reduced synthesis cost. In some designs, Li content may be reduced to below about 60 at. % (e.g., to about 20-50 at. %) if higher temperatures or pressure or more reactive (e.g., smaller alcohol) molecules are used. However, keeping the temperature at near-room temperature and pressure at near-atmospheric may also be beneficial in some designs. As such, forming Zn and Zn alkoxide NWs using isopropanol and relatively high Li content in the Li—Zn alloys (e.g., above around 60 at. %) may be advantageous in some designs.

In some designs, a portion of Li in the Li—Zn alloys may be removed using another solvent that has dramatically lower reactivity/solubility for Zn compared to Li (e.g., not isopropanol), thereby producing pores in the alloy particles. In some designs, thus produced porous Li—Zn alloy with reduced Li content may still remain highly reactive towards isopropanol (or another similar alcohol or solvent) and be further converted to Zn-containing NWs upon the dealloying reaction.

In some designs, ternary alloys (e.g., Li—Zn—Mg or Li—Zn—Si or Li—Zn—Al or Li—Zn—W or Li—Zn—Sr, etc.) may be similarly used to prepare Zn-containing NWs that additionally comprise other metals or semimetals (e.g., Mg, Si, Al, Sr, W, etc.). Such mixed metal NWs may be transformed to mixed metal alloy NWs or mixed metal ceramic NWs, which may be advantageously used in some applications.

In some designs, Li in the alloy may be replaced with other reactive metals, such as Ca (e.g., in some cases—K, Na, etc.). In some designs, replacing Li in the alloy with other reactive metal(s) may offer additional opportunities to produce mixed-metal Zn-comprising alloys or mixed-metal Zn-comprising ceramics with metals that have very low solubility in Li (e.g., Cu).

The Growth and Characterization of Dealloyed NWs

FIG. 1(a) illustrates photographs of $Zn_{0.3}Li_{0.7}$ during different stages of dealloying, which shows how bulk alloys gradually converted into a spongy material and then ultimately into NWs (see Experimental Details section below for more details). FIG. 1(c) shows the XRD pattern of the as-synthesized NWs. The XRD pattern of the as-synthesized NWs could not be matched to any Joint Committee on Powder Diffraction Standards (JCPDS) file for any known single compound. However, some of the diffraction peaks could be matched to crystalline Zn and some broad peaks to $Li_2CO_3$ impurities, and the remainder diffraction peaks assigned to Zn-isopropoxide.

FTIR analysis of vacuum dried samples of the as-synthesized NWs revealed a broad peak at 1378 $cm^{-1}$ corresponding to C—O stretching of isopropanol, whereas the peaks at 1101 and 817 $cm^{-1}$ could be assigned to the C—O stretching and bending of C—H, and those below 500 $cm^{-1}$ likely originating from stretching/bending of Zn—O bonds (FIG. 1d). Such results suggest that the dealloyed NWs comprise polymeric —Zn—O-chains (formed via hydrolysis of isopropoxide by water) along with Zn-isopropoxide bonds and some H-bonded isopropanol(s). In some designs, produced NWs may be dried and intentionally exposed to moisture-containing environment to enhance the degree of hydrolysis. This may enhance mechanical properties of the NWs and enable their transformation to ceramic NWs upon further treatments (e.g., to ZnO, $Zn_3N_4$, $Zn_3P_2$, $ZnF_2$, zinc oxynitride, zinc phosphate ($Zn_3(PO_4)_2$), zinc oxyphosphate, zinc oxyfluoride, etc., and their various mixtures and composites).

FIG. 1(e) illustrates a wide-scan X-ray photoelectron spectroscopy (XPS) spectrum of the same material, which revealed the presence of the expected elements (Zn, C and O). FIG. 1(f) illustrates a Zn 2p core level spectrum with two peaks at 1044.56 and 1021.42 eV with a characteristic peak separation of 23.14 eV, consistent with +2 oxidation state of Zn. The O(1 s) and C(1 s) signals appeared at 531.70 and 133.70 eV, respectively, which corresponds to the oxygen and carbon atoms in the Zn-alkoxide or isopropanol moieties.

Taking the XRD and XPS analyses together, a mixture of Zn and Zn isopropoxide NWs was simultaneously formed after dealloying. The overall reaction can be represented by the following chemical equation:

$$Zn—Li+(1+nx+px)^iPrOH \rightarrow (1-x)Zn+x[Zn(O^iPr)_n(^iP-rOH)_p]+LiO^iPr+(1+nx+px)/2H_2 \quad \text{Chemical Equation (1)}$$

Figure 1I:
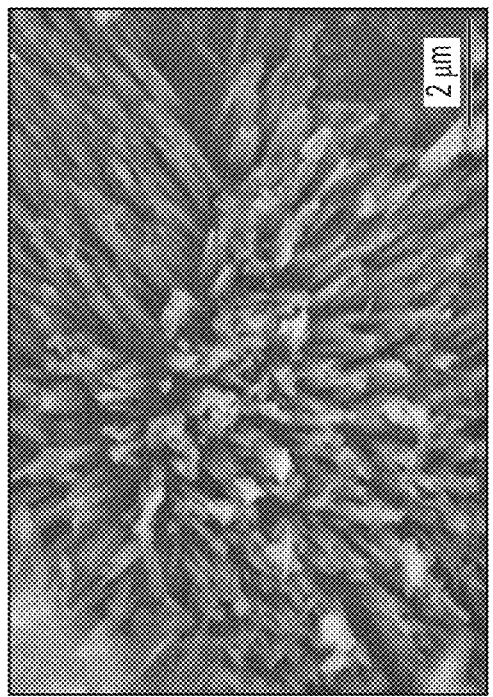
Figure 1K:
Figure 1H:
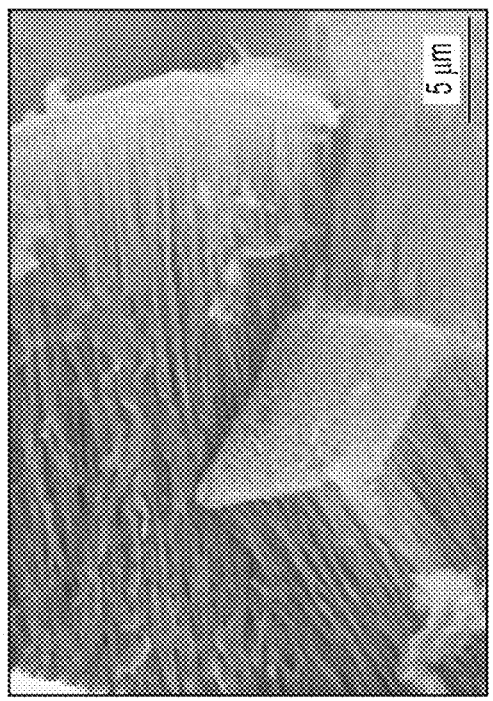
Figure 1J:
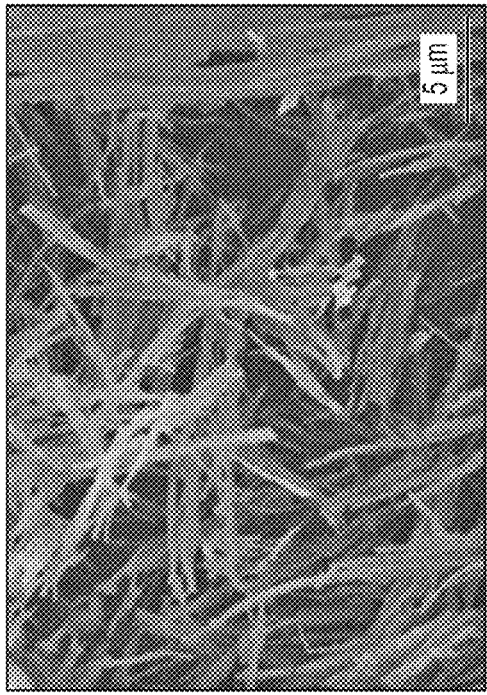
Figure 7A:
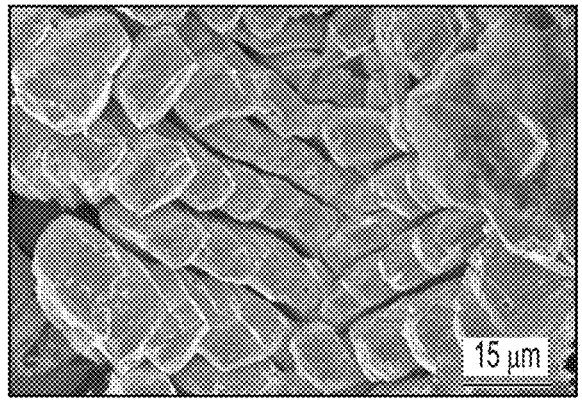
FIGS. 7(a)-(d) illustrate SEM micrographs of $Zn_{0.3}Li_{0.7}$ alloy dealloyed in ethanol (a) and methanol (b) for 10 min, and corresponding products (c)-(d) after reaction, respectively.
Figure 7B:
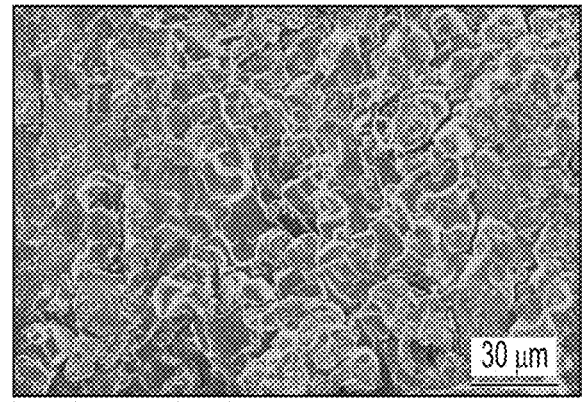
Figure 7C:
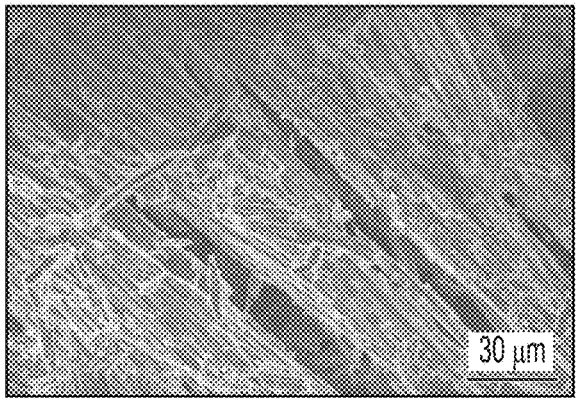
Figure 7D:
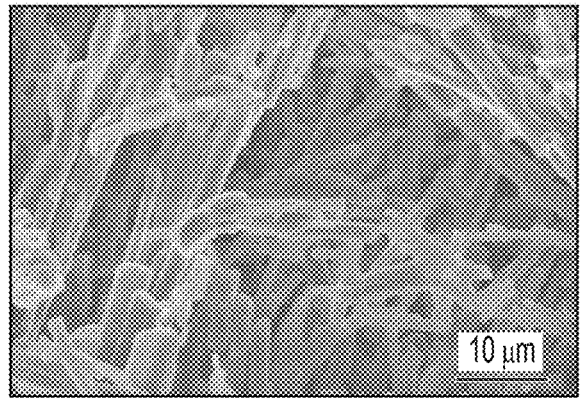

SEM images of the dealloyed samples revealed the presence of both NWs bundles (FIG. 1(h)) evolving from the cuboid ZnLi alloy and split NWs (FIG. 1(j) and (k)). FIG. 1(i) shows a top view of the vertically aligned nanowire arrays, where NWs are practically free-standing and perpendicular to the alloy grain surface. From analysis of randomly selected 200 split NWs, the average diameter of the as-resulted hybrid Zn and Zn-isopropoxide NWs was calculated as ~90 nm (FIG. 1(g)). This is consistent with the analysis based on TEM, which also revealed diameters of randomly selected NWs of ~100 nm (FIGS. 7(a)-(d)). It is noteworthy that high-resolution TEM and associated selected area electron diffraction (SAED) did not reveal any distinct lattice fringes, in contrast to sharp XRD peaks obtained for the same material. As might be expected from the low melting point of Zn isopropoxide, heat generated during TEM imaging (300 kV) induced visible damage and shape distortion of NWs, which suggests that the NWs are sensitive to electron beams and prone to degradation under the conditions explored (FIG. 7(b)).

Evolution Process from Bulk LiZn Alloy to 1D NWs

Even though pure Zn metal has a relatively low oxidation potential (−0.762 V vs SHE), its exposure to anhydrous alcohols such as methanol, ethanol, n-propanol and isopropanol results in no reaction in some designs, even at elevated temperatures close to their respective boiling points, presumably because of surface passivation by a native oxide layer. Thus, by exposing ZnLi alloy to alcohol, reactive Zn surfaces may be continuously generated via rapid dissolution of more reactive Li (formation of soluble Li-alkoxide); this process not only exposes the atomic Zn for reaction with alcohols, but also allows their atomic rearrangement due to strain energy minimization in some designs. Additionally, in some designs, the cavities created due to faster dissolution of the Li compensates for the volume changes associated with the formation of fluffy Zn-alkoxide NWs. In some designs, this approach is similar to the dealloying of AlLi and MgLi alloys using anhydrous alcohols.

Figure 8A:
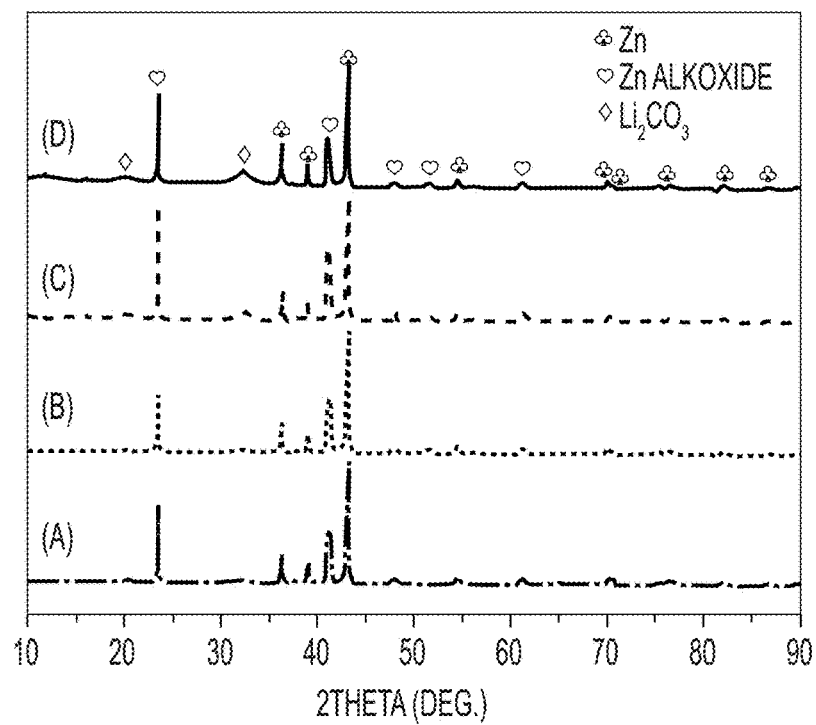
FIG. 8(a) illustrates XRD profiles (patterns a-d are assigned to $Zn_{0.4}Li_{0.6}$, $Zn_{0.3}Li_{0.7}$, $Zn_{0.2}Li_{0.8}$, $Zn_{0.1}Li_{0.9}$, respectively)

When the $Zn_{0.3}Li_{0.7}$ alloy is immersed into ethanol ($C_2H_5OH$), the columnar ZnLi grains with parallel ravines on the surface begin to nucleate and grow after ~10 min (FIG. 8(a)). This phenomenon illustrates that there is more lithium aggregation at the grain boundaries in some designs, where the delithiation occurs more rapidly in the first few minutes.

Figure 8B:
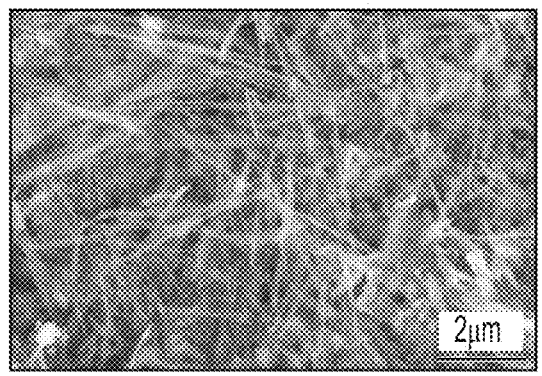
FIGS. 8(b)-(e) illustrates corresponding SEM morphology of NWs resulted from dealloying LiZn alloy with different composition ($Zn_{0.4}Li_{0.6}$, $Zn_{0.3}Li_{0.7}$, $Zn_{0.2}Li_{0.8}$, $Zn_{0.3}Li_{0.9}$, respectively).
Figure 8C:
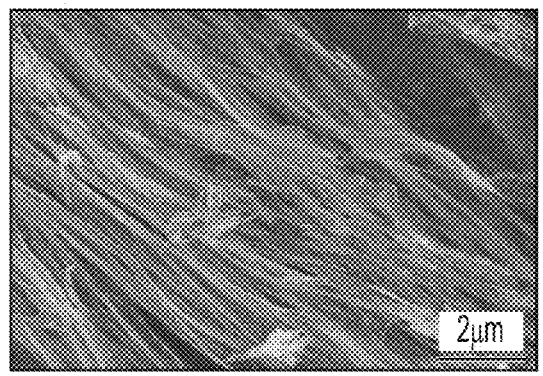
Figure 8D:
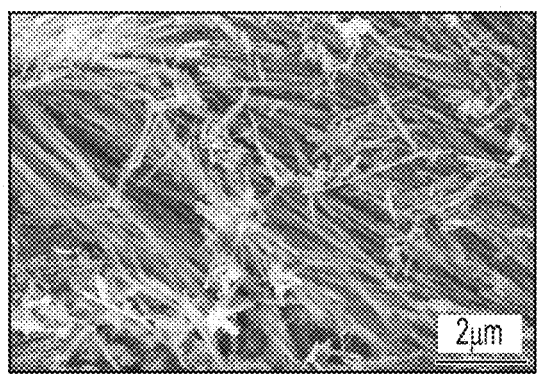
Figure 8E:
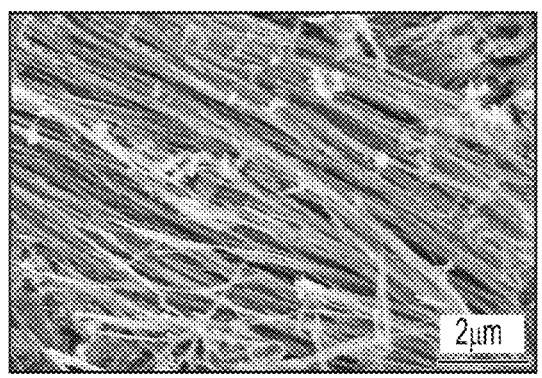

In contrast to isopropanol exposure, a dramatically faster and therefore less controllable reaction takes place upon immersion of LiZn alloys into methanal ($CH_3OH$) at room temperature in some designs (FIG. 8(b)). Here, the delithiation may occur rapidly not only at the grain boundaries, but also in the interior of alloy grains due to higher polarity and acidity of methanol (15.5 pKa) than ethanol (15.97 pKa). In some designs, the morphologies of the dealloyed products in both ethanol and methanol exhibit rod-like morphology (FIG. 8(c)-(d)). In some designs, the undesirably fast reaction may be slowed down if ternary or quaternary alloys are used, where non-Zn metals are less reactive towards small alcohols, such as methanol or ethanol. In some designs, the reaction may be slowed down at lower temperatures or by the dilution of the methanol with less reactive or not reactive solvents. In some designs, the reaction may slow down in a less polar and less acidic solvent such as isopropanol (17.1 pKa). Indeed, the exposure of LiZn alloy into isopropanol results in the formation of ultrafine NWs.

FIGS. 2(a)-(f) show a time-lapse look into the reaction of representative $Zn_{0.3}Li_{0.7}$ alloy with isopropanol in accordance with an aspect of the disclosure. FIG. 2(a) shows the SEM micrograph of the fractured surface of as-produced $Zn_{0.3}Li_{0.7}$ alloy. As NWs form along a certain orientation in the crystalline grains (FIG. 1(h)-(k)), there is evidently a dependence of NW formation kinetics on ZnLi grain orientation, resulting in a preferential growth along specific crystallographic plane(s). This is similar to the growth of epitaxial Si NWs on oriented Si substrate, where 1D structures form upon preferential extraction of one component of the material. This suggests that the formation kinetics is likely controlled via mass transport. Here, the NWs formation is primarily determined by the extraction of $Li^+$ ions out of Zn—Li alloy; the driving force generated by the dissolution of $Li^+$ ions resulted in associated tensile stresses between surface or/and interface layer and the unreacted alloy surface. Moreover, the insertion of $^iPrO(H)$ groups may lead to the compression stress as shown in Chemical Equation 1 (above). The interfacial stresses may thus be responsible for the 1D shape of the produced NWs. At the initial dealloying reaction (up to about 10 min), the alcohol molecules preferentially react with the Li-rich grain boundaries causing grains to separate from each other, resulting in the formation of short NW clusters (FIG. 2(b)). Subsequently, $^iPrOH$ continually reacts with the Li within the grain interiors and slowly with Zn in the Zn-rich phases. After 1 h (FIG. 2(c)), some pores can be seen on the surface of the alloy and some NWs start to grow as forests, with length of the NWs being ca. 5-10 µm. After 5 h (FIG. 2(d)), abundant NWs bundles can be seen on the surface of Zn—Li alloy. The chemical delithiation reaction continues for about 24 h, after which the dealloyed samples appear as the NWs bundles with anisotropic orientation (FIG. 2(e)). From the grain morphology of ZnLi alloy (FIGS. 5(a)-(b)), most NWs appear to grow along the crystallographic (001) plane of the ZnLi grain. The developing tensile stresses may give rise to intermediate formation of nanosized cracks between fresh Zn layer on ZnLi surface and the strain-triggered nanosized islands. Such islands would partly transform into Zn-isopropoxide and, meanwhile, are deemed as localized nuclei for further NWs growth. The isotropic swelling of the islands in one ZnLi alloy grain promotes vertical expansion while suppressing lateral expansion. After 48 h, the NWs are further washed with fresh reaction solvents, and collected by centrifugation. FIG. 2(f) shows the morphology of the as-produced NWs after drying. A schematic diagram illustrating the NWs growth process is shown in FIG. 2(f), which is primarily divided into two major stages. Stage I concerns with the grain delithiation of ZnLi alloy from surface to the interior of the alloys accompanied by the formation of short NWs bundles, while Stage II illustrates the consistent growth NWs bundles until alloy particles are completely converted into hybrid Zn and Zn alkoxide NWs bundles and their splitting into individual NWs.

The Effect of Li Content and Dealloying Temperature on the NWs Formation

To investigate the influence of Li content in the alloy on the NWs formation, Zn composition was varied from about 10 to about 50 at. % in the alloys and their dealloying reaction products were examined by SEM and XRD. At or below about 50 at. % Li content in the alloy (i.e., $Zn_{0.5}Li_{0.5}$), the delithiation ceased after approximately 2-4 h, resulting in just slight alloy "swelling". For alloys with greater than about 60% at. % (i.e., $Zn_{0.4}Li_{0.6}$, $Zn_{0.3}Li_{0.7}$, $Zn_{0.2}Li_{0.8}$ and $Zn_{0.1}Li_{0.9}$), the delithiation results in hybrid 1D NWs formation based on XRD and SEM analyses (FIGS. 8(a)-(e)). Reaction rates also monotonically increased with the increment of Li component in ZnLi alloy at room temperature. For example, while it took about 48 h for large (e.g., >about 2-4 mm) pieces of $Zn_{0.4}Li_{0.6}$ samples to completely convert into the NWs bundles, the same conversion for similar-sized $Zn_{0.1}Li_{0.9}$ was achieved in less than about 15 h. The XRD patterns of the produced NWs for the above compositions are essentially similar (FIG. 8(a)); however, one could see enhanced $Li_2CO_3$ impurities as the Li content in the alloy increased. The dealloyed NWs morphologies corresponding to $Zn_{0.4}Li_{0.6}$, $Zn_{0.3}Li_{0.7}$, $Zn_{0.2}Li_{0.8}$ and $Zn_{0.1}Li_{0.9}$ alloys are shown in FIG. 8(b)-(e), which are similar in terms of their thicknesses but different in terms of their lengths.

In some designs, an Mg—Li alloy with higher Li composition may contribute to the formation of longer (e.g., about 100-200 µm) Mg-isopropoxide NWs due to the relatively high ductility of such alloys. In a similar manner, we observed that the $Zn_{0.2}Li_{0.8}$ and $Zn_{0.1}Li_{0.9}$ alloys yielded longer NWs in comparison with $Zn_{0.4}Li_{0.6}$ alloy. Presumably, ZnLi alloys with higher Li content exhibit increased ductility and toughness compared to the lower Li-containing ZnLi alloys, likely because pure Zn exhibits dramatically higher elastic moduli than pure Li. Since the growth process of NWs is associated with significant volume expansion, the stiffer ZnLi alloy (lower Li content) may experience difficulty in deformation. Similarly, since NWs growth proceeds consistently from the surface to inwards of the grain, this propagation process may be suppressed at the reaction front due to the limited tensile stress in the stiffer alloy. Furthermore, for larger content of Li atoms, their dissolution may provide more space for rearrangement of atoms and accommodation of the volume expansion associated with the Zn alkoxide formation, which would release the internal stresses to accelerate NWs growth. In some designs, the maximum attainable length or the aspect ratio (length to diameter ratio) of resultant NWs produced via dealloying Li-bearing binary alloys may be determined primarily by the grain sizes of initial alloys. In some designs, through tailoring the grain size of starting alloys, a series of NWs with different ratio of length to diameter can in principle be obtained. Despite faster reactions and longer NWs formations with the higher Li content alloys, a caveat, however, is that their delithiation tends to produce greater bundle contents that may become more difficult to split in some designs, and, also, their purifications from the Li-alkoxides are more difficult in some designs.

Figure 9A:
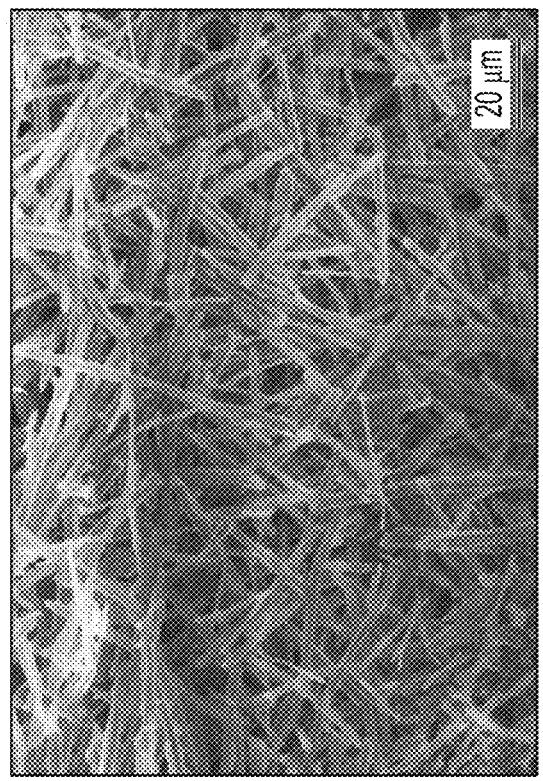
FIGS. 9(a)-(b) illustrates SEM morphology of $Zn_{0.3}Li_{0.7}$ alloy after dealloying in isopropanol at 70° C.
Figure 9B:
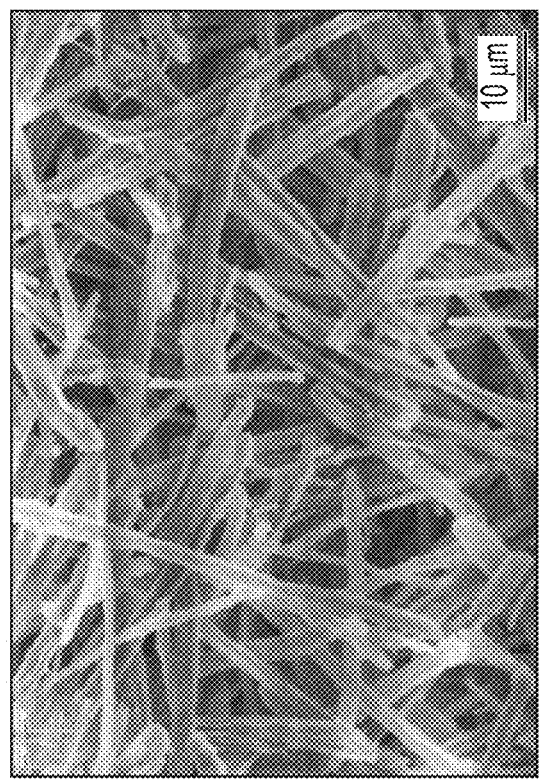

In some designs, temperature may also affect the dealloying reactions. For example, performing the dealloying of $Zn_{0.3}Li_{0.7}$ in isopropanol at 70° C. results in a coarse rod-like morphology (FIGS. 9(a)-(b)). Higher temperature prompts a more severe delithiation reaction, during which the anisotropic swelling of the islands led by tensile stress in the ZnLi alloy promotes not only vertical expansion but also the lateral expansion.

Transformation of Hybrid NWs to Pure Zn Metal NWs

Figures 10A, 10B:
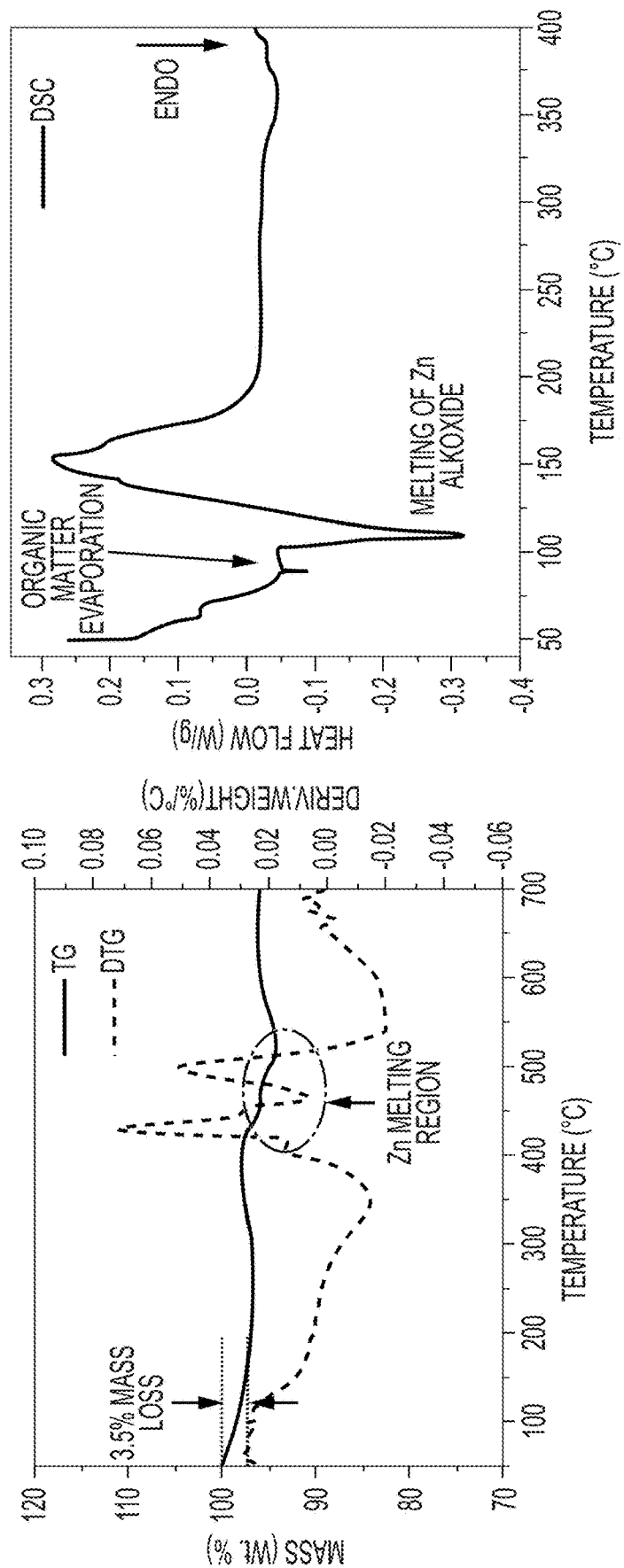
FIG. 10(a)-(b) illustrates TGA/DSC analysis of dealloyed NWs.

In order to obtain a pure Zn composition and phase of the produced NWs, the as-synthesized mixed NWs comprising both Zn and Zn-isopropoxide NWs was annealed. Thermogravimetric and differential scanning calorimetry analyses (TGA and DSC) of dealloyed NWs in the temperature range of about 50-700° C. (TG) and about 50-400° C. (DSC) under $N_2$ protection revealed very small mass losses up to ~200° C., but steadily increases till Zn melting point at 419.5° C., as $^iPrO(H)$ groups decompose and evaporate (FIG. 10(a)). An endothermic peak appearing at ~85° C. observed by DSC (FIG. 10(b)) may be associated with the evaporation of residual alcohol bound to metal centers, since the boiling point of isopropanol is ~78° C. Another endothermic peak at ~112° C. may be related to thermal decomposition of the alkoxide. At higher temperatures no clear peaks are identified, suggesting no additional phase transition or chemical reaction.

Interestingly, the thermal annealing for the as-produced NWs in oxygen-containing atmosphere did not yield the expected ZnO NWs unlike other oxide NWs obtained with Al, Mg, and Cu, and instead platelet like ZnO particles were obtained; this is likely due to significant stresses associated with the oxidation that exceed the fracture toughness of the NWs. In contrast, higher degree of hydrolysis of NWs (Zn-iPrO(H)—OH and ultimately near-complete conversion to $Zn(OH)_2$ NWs) may help preserve the NW shape/morphology upon conversion to oxide or other ceramic NWs.

Figure 12A:
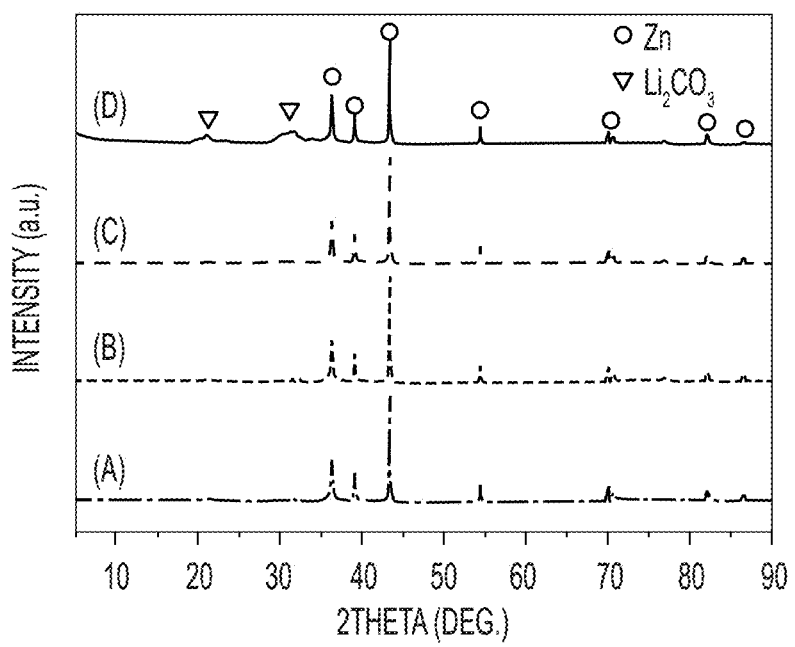
FIG. 12(a) illustrates (a) XRD profiles (patterns a-d are assigned to $Zn_{0.4}Li_{0.6}$, $Zn_{0.3}Li_{0.7}$, $Zn_{0.2}Li_{0.8}$, $Zn_{0.1}L_{0.9}$, respectively)
Figure 12B:
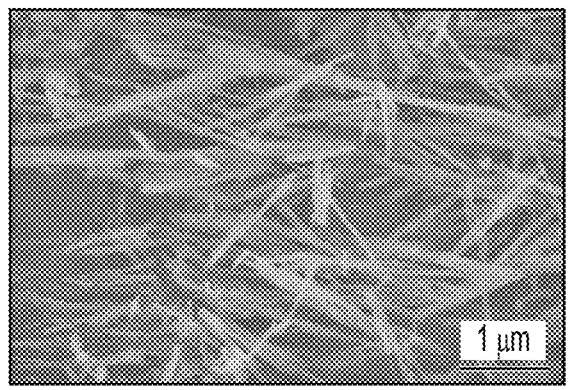
FIGS. 12(b)-(e) illustrate SEM morphology of Zn NWs resulted from dealloying LiZn alloy with different composition ($Zn_{0.4}Li_{0.6}$, $Zn_{0.3}Li_{0.7}$, $Zn_{0.2}Li_{0.8}$, $Zn_{0.1}Li_{0.9}$, respectively) and annealing at 250° C. for 1 h in $H_2$—Ar.
Figure 12C:
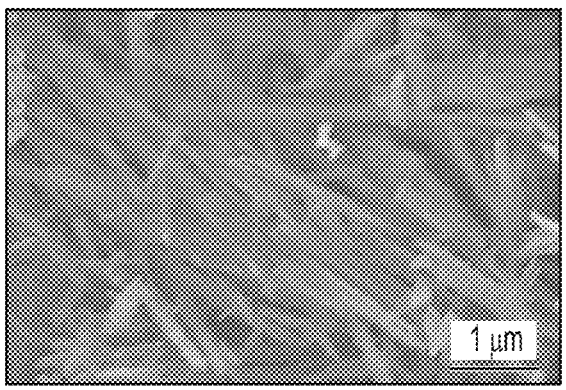
Figure 12D:
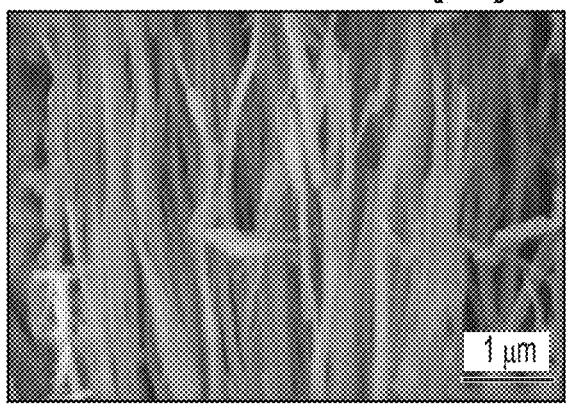
Figure 12E:
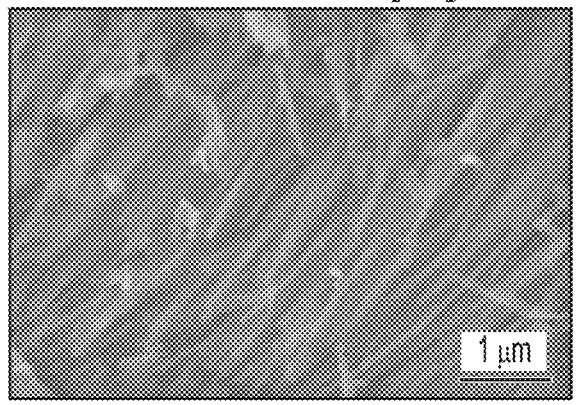

In contrast, thermal reduction of mixed Zn and Zn-isopropoxide NWs in $H_2$—Ar at up to about 250° C. afforded pure Zn metal NWs based on XRD analysis (FIG. 3(a)). Surprisingly, the morphology of the Zn metal remains very similar to that of the pristine dealloyed NWs based on SEM analysis (FIG. 3(b)). High-resolution TEM and SAED analyses are suggestive of polycrystalline phases (FIG. 3(b)-(d)). Small quantities of residual Li-containing impurities do not appear to have a significant impact on Zn NWs morphology after annealing (FIG. 12). In particular, FIG. 12(a) illustrates (a) XRD profiles (patterns a-d are assigned to $Zn_{0.4}Li_{0.6}$, $Zn_{0.3}Li_{0.7}$, $Zn_{0.2}Li_{0.8}$, $Zn_{0.1}Li_{0.9}$, respectively) and FIGS. 9(b)-(e) illustrate SEM morphology of Zn NWs resulted from dealloying LiZn alloy with different composition ($Zn_{0.4}Li_{0.6}$, $Zn_{0.3}Li_{0.7}$, $Zn_{0.2}Li_{0.8}$, $Zn_{0.1}Li_{0.9}$, respectively) and annealing at 250° C. for 1 h in $H_2$—Ar.

In summary, sub-100 nm diameter Zn-propoxide and Zn nanowires may be synthesized based on dealloying of binary ZnLi bulk alloys in isopropanol. In some designs, this synthesis process is scalable, template/catalyst/additive-free, and does not require use of any energy-intensive instrumentations. In some designs, the growth of the forest of NWs proceeds from the surface of each alloy grain as Li dissolves into an alcohol solution, greatly accelerating the Zn-propoxide formation. In some designs, upon conversion of the alloy into propoxide, there is a significant volume expansion and the associated strain between the NWs and the alloy grain. In some designs, the balance between the minimization of strain energy at the reaction front interphase and the surface energy of the NWs (so as to minimize the Gibbs free energy of the system) likely defines the NW diameter. Mechanistically, in some designs, more reactive Li at the grain boundaries dissolves first, followed by reaction within the grain (accompanies by dissolution of Li ions from the bulk and concomitant rearrangement of the Zn ions and their reactions with isopropanol) results in the formation of Zn and Zn isopropoxide NWs. In some designs, alloy composition, alcohol acidity, and reaction temperature in the NWs growth process may play critical roles in the synthesis process. Finally, in some designs, the pure phase of Zn NWs can be obtained by the thermal annealing of the mixed Zn and Zn isopropoxide NWs. In some designs, the simplicity and affordability of Zn NW synthesis as described herein based on a rather simple two-stage process (dealloying+annealing) may, for the first time, bridge the gap of mere demonstration and large-scale production of electrically conductive NWs, which may facilitate Zn NWs to be adopted by applications in diverse fields. In some designs, the produced Zn metal NWs or Zn-comprising NWs may be porous.

In some designs, Zn metal and Zn-containing metal alloy NWs may be used as conductive components for the conductive polymer matrix composites or conductive paints or conductive electrodes (including transparent or semitransparent electrodes), screens or conductive metal-ceramic composites.

In some designs, Zn metal and Zn-containing metal alloy NWs may be used as biocompatible or biodegradable or antibacterial components for medial or biomedical applications.

In some designs, zinc phosphate NWs or zinc hydroxy phosphate NWs or zinc hydroxy phosphate sulfate NWs or zinc phosphate sulfate NWs or zinc hydroxy sulfate NWs or zinc sulfate NWs or zinc carbonate NWs or zinc carbonate phosphate NWs or zinc silicate NWs or zinc phosphate NWs or zinc oxide NWs or Zn sulfide NWs or Zn nitride NWs or Zn fluoride NWs or Zn oxyfluoride NWs or other zinc-comprising ceramic NWs may be produced by suitable treatments of the precursor (e.g., zinc alkoxide) NWs and used instead of Zn metal or Zn metal alloy NWs in order to attain certain desired functionality (e.g., reduce the excessive Zn ion release during degradation in biological or other media or improve wetting with the matrix material if used in polymer-matrix or metal-matrix or ceramic-matrix composites or improve mechanical strength or improve thermal stability or reduce electrical conductivity or enhance solubility or dispersion, etc.). The particular or most suitable chemistry of the NWs may be selected for a specific application requirement.

In some designs, zinc metal NWs may be coated with a surface layer of phosphate or oxide or oxyphosphate or nitride or oxynitride or fluoride or oxyfluoride or sulfide or carbide or molybdate or chromate of Zn or another suitable metal or semimetal (e.g., Al, Si, Ca, Mg, W, Ti, Fe, etc.) for attaining favorable surface properties (e.g., better wetting by the matrix material if used in composites or stronger adhesion or corrosion protection, etc.) or enhanced bulk properties (e.g., improved thermal stability, higher hardness, higher modulus, etc.). The particular or most suitable chemistry of the surface coatings of NWs may be selected for a specific application requirement.

In some designs, zinc oxide NWs, zinc phosphate NWs, zinc oxyphosphate NWs, zinc nitride NWs, zinc oxynitride NWs and others may be used as adjuvants in vaccines. In some designs, in addition to zinc metal, such NWs may additionally comprise other metals or semimetals, such as Al, Mg, Ca, W, Ti, Fe, Si, Sr, etc.

In some designs, zinc metal NWs, zinc metal alloy NWs, zinc oxide NWs, zinc fluoride NWs, zinc oxyfluoride NWs, zinc phosphate NWs, zinc oxyphosphate NWs, zinc nitride NWs, zinc sulfide NWs, zinc oxynitride NWs or other zinc-based or zinc-comprising ceramic NWs (e.g., which may additionally comprise other suitable metals, in some designs) may be used for metal matrix composites or polymer matrix composites or glass matrix composites or ceramic matrix composites. In case of metal matrix composites, in some designs it may be advantageous for the Zn-comprising NWs be a ceramic (or salt). In some designs, it may be advantageous for the metal in the metal matrix composites to comprise at least one of the following elements: aluminum (Al) or titanium (Ti) or magnesium (Mg) or iron (Fe) or nickel (Ni). In some designs when Zn metal NWs or Zn-comprising NWs are used in the formation of polymer matrix composites, it may be advantageous for the polymer matrix to comprise at least one of the following polymers: various epoxies (e.g., various glycidyl compounds), olefins, cellulose, nylon, polytetrafluoroethylene, various polysaccharides and mixture of polysaccharides with other polymers including but not limited to proteins (e.g., arabinoxylans, gum arabic, xanthan gum, pectins, chitin and chitin derivatives, cellulose and cellulose derivatives including various modified natural polymers, such as cellulose acetate (CA), cellulose acetate butyrate (CBA), carboxymethylcellulose (CMC), cellulose nitrate (CN), ethyl cellulose (EC), among others cellulose derivatives, alginates including alginic acids and its salts, etc.); acrylonitrile-butadiene-styrene (ABS); allyl resin (Allyl); casein (CS); cresol-formaldehyde (CF); chlorinated polyethylene (CPE); chlorinated polyvinyl chloride (CPVC); various epoxies (polyepoxides) (including fluorinated epoxies); epichlorhydrin copolymers (ECO); ethylene-propylene-diene terpolymer (EPDM); ethylene-propylene copolymer (EPM); ethylene vinyl acetate copolymer (EVA); ethylene vinyl alcohol (E/VAL); various fluoropolymers (such as polytetrafluoroethylene (PTFE), polytetrafluoroethylene (PCTFE), perfluoroalkoxy polymer (PFA/MFA), fluorinated ethylene-propylene (FEP), tetrafluoroethylene, hexafluoropropylene, vinylidene fluoride and their co-polymers (e.g., THV), poly ethylenetetrafluoroethylene (ETFE), polyethylenechlorotrifluoroethylene (ECTFE), various perfluorinated elastomers (FFPM/FFKM), various fluorocarbons including chlorotrifluoroethylenevinylidene fluoride (FPM/FKM), tetrafluoroethylene-propylene (FEPM), perfluoropolyether (PFPE), perfluorosulfonic acid (PFSA), perfluoropolyoxetane, polyvinylfluoride (PVF), polyvinylidene fluoride (PVDF), various fluorosilicone rubbers (vinyl, methyl, etc.), among others); various ionomer—thermoplastic polymers; isobutene-isoprene copolymer (IIR); various liquid crystal polymers (LCP); melamine formaldehyde (MF); natural rubber (NR); phenol-formaldehyde plastic (PF); polyoxymethylene (POM); polyacrylate (ACM); polyacrylic acid (PAA); polyacrylic amide, polyacrylonitrile (PAN); various polyamides (PA) (including various aromatic polyamides often called aramids or polyaramids); polyaryletherketone (PAEK); polybutadiene (PBD); polybutylene (PB); polybutylene teraphtalate (PBTP); polycarbonate (PC); polychloromethyloxirane (epichlorhydrin polymer) (CO); polychloroprene (CR); polydicyclopentadiene (PDCP); polyester (in the form of either thermoplastic or thermoset polycondensate); polyetheretherketone (PEEK); polyetherimide (PEI); polyethersulfone (PES); polyethylene (PE); polyethylenechlorinates (PEC); polyethylene teraphtalate (PET); poly(3,4-ethylenedioxythiophene) polystyrene sulfonate (PEDOT:PSS); phenol-formaldehyde (PF); polyimide (PI) (as thermoplastic or thermoset polycondensate); polyisobutylene (PIB); polymethyl methacrylate (PMMA); polymethylpentene (PMP); polyoxymethylene (POM); polyketone (PK); polymethylpentene (PMP); polyethylene oxide (PEO); polyphenylene Oxide (PPO); polyphenylene sulfide (PPS); polyphthalamide (PTA); polypropylene (PP); propylene oxide copolymer (GPO); polystyrene (PS); polysulfone (PSU); polyester urethane (AU); polyether urethane (PUR); polyvinylalcohol (PVA); polyvinylacetate (PVAc); polyvinyl butyral (PVB); polyvinylchloride (PVC); polyvinyl formal (PVF); polyvinylidene chloride (PVDC); styrene-acrylonitrile copolymer (SAN); styrene-butadiene copolymers (SBR and YSBR); various silicones (SI) (such as polydimethylsiloxanes, polymethylhydrosiloxane, hexamethyldisiloxane, SYLGARD, various silicone elastomers ((phenyl, methyl) (PMQ), (phenyl, vinyl, methyl) (PMVQ), (vinyl, methyl) (VMQ), etc.); polyisoprene; urea-formaldehyde (UF), among others. In some designs, some of such polymers may be at least partially fluorinated. In some designs, polymers and co-polymers of the polymer matrix may comprise at least one of the following monomer constituents: acrylates and modified acrylates (methylacrylate, methylmethacrylate, etc.), diallylphthalates, dianhydrides, amines, alcohols, anhydrides, epoxies, dipodals, imides (polyimides), furans, melamines, parylenes, phenol-formaldehydes, polyesters, urea-formaldehydes, urethanes, acetals, amides, butylene terephthalates, carbonates, ether ketones, ethylenes, phenylene sulfides, propylenes, styrene, sulfones, vinyl, vinyl butyrals, vinyl chlorides, butylenes, chlorobutyls, fluorobutyls, bromobutyls, epichlorohydrins, fluorocarbons, isoprenes, neoprenes, nitriles, sulfides, silicones, among others.

In some designs, zinc metal NWs, zinc metal alloys NWs, zinc oxide NWs, zinc fluoride NWs, zinc oxyfluoride NWs, zinc phosphate NWs, zinc oxyphosphate NWs, zinc nitride NWs, zinc sulfide NWs, zinc oxynitride NWs or other zinc-based or zinc-comprising ceramic NWs (e.g., which may additionally comprise other suitable metals, in some designs) may be used in anti-bactericidal or anti-viral materials or coatings (e.g., antibacterial fabrics or clothing, patches, masks, medical equipment or hospital furniture finishes, surface coatings, tools, etc.).

In some designs, zinc oxide (or other zinc-based) NWs may be used as hard templates for the formation of various hollow NW structures (e.g., hollow tubes) or porous compounds. In one illustrative example, ZnO NWs or Zn metal NWs may be coated with a layer of another material (e.g., carbon or an oxide of another metal or another ceramic compound) and then ZnO (or Zn) may be removed, for example, by dissolution in moderate acids or by hydrothermal reduction. In another illustrative example, ZnO NWs or Zn metal NWs may be infiltrated into a matrix, followed by matrix hardening (e.g., by using a thermal or a chemical processes) and NW removal (e.g., by dissolution in acid or thermal treatment or hydrothermal reduction, etc.).

In some designs, zinc-comprising nanowire fabrication in accordance with one or more aspects of the disclosure may include: (a) formation of zinc metal alloy with at least one other metal, (b) exposing the zinc metal alloy to one or more alcohols at suitable temperature and pressure to produce zinc-comprising nanowires, (c) optionally separating the zinc-comprising nanowires from the liquid and (d) optionally exposing the zinc-comprising nanowires to a chemically reducing environment (a gaseous or liquid environment comprising a chemical reducing agent) at suitable pressures (e.g., around 1 atm, in some designs) and temperatures. In some designs, at least one other metal may be selected from: Li, Na, K, Ca, Sr, Mg. In some designs (e.g., in case of Zn—Li alloys), the atomic fraction of Zn in the alloy may be below about 50 at. % (e.g., 10-40 at. %). In some designs, one or more alcohols may be selected from: 1-propanol ($C_3H_7OH$) and 2-propanol ($C_3H_7OH$). In some designs, a chemical reducing agent may be selected from: lithium aluminium hydride ($LiAlH_4$); sodium bis(2-methoxyethoxy) aluminium hydride ($NaAlH_2(OCH_2CH_2OCH_3)_2$); hydrogen; lithium borohydride ($LiBH_4$); sodium borohydride ($NaBH_4$); iron sulfate. In some designs, the chemical reduction may take place at a reduced temperature or at around room temperature or at elevated temperatures (e.g., from around 0° C. to from around 500° C.; in some designs, from around 0° C. to around 50° C. or from around 50° C. to around 100° C. or from around 100° C. to around 200° C. or from around 200° C. to around 300° C. or from around 300° C. to around 400° C. or from around 400° C. to around 500° C.). In some designs, exposing the zinc metal alloy to one or more alcohols may take place at a pressure selected in the range from about 0.1 atm. to about 20 atm (in some designs, the suitable pressure may be around 1 atm). In some designs, exposing the zinc metal alloy to one or more alcohols may take place at temperatures selected in the range from about 0° C. to about 100° C. (in some designs, from around room temperature to around 60° C.). In some designs, zinc-comprising nanowire may be a zinc metal nanowire or a zinc metal alloy nanowire. In some designs, zinc-comprising nanowire may be porous. In some designs, the average specific surface area of the zinc-comprising nanowire may be in the range from about 5 to about 500 $m^2/g$. In some designs, the aspect ratio of the zinc-comprising nanowires may be in the range from about 1:10 to about 1:100,000.

Figure 13:
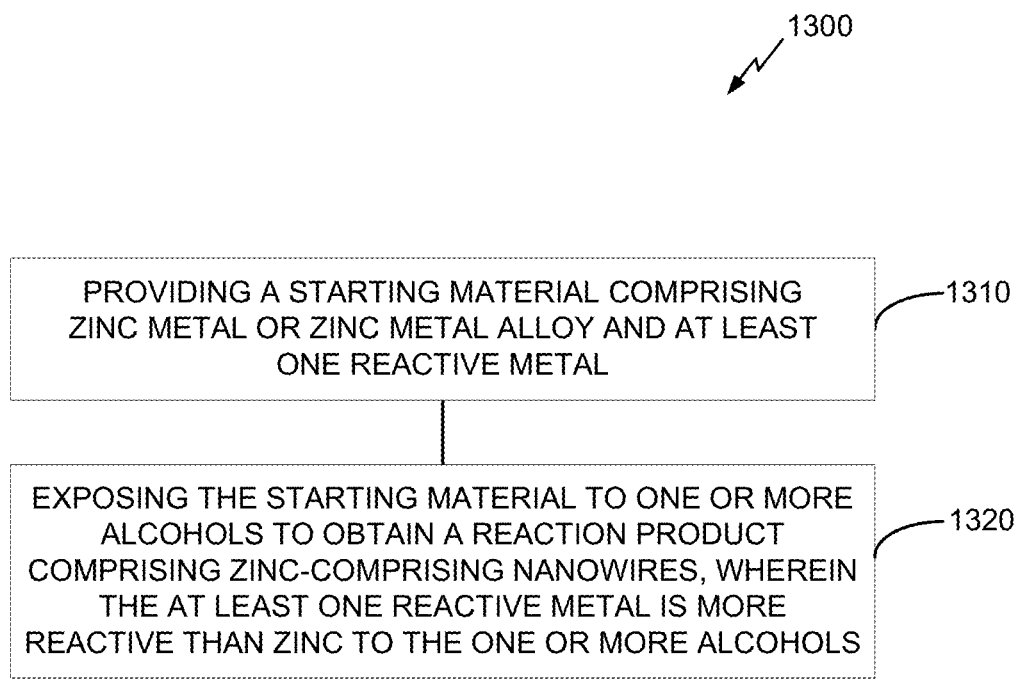
FIG. 13 illustrates a flow diagram of a method of fabricating zinc-comprising nanowires.

FIG. 13 illustrates a process 1300 in accordance with aspects of the disclosure. In particular, the process 1300 provides an alternative characterization of various aspects described above (and which is supported by these above-described various aspects), the detailed experimental examples of which are described below in more detail.

Referring to FIG. 13, at 1310, a starting material is formed (or otherwise provided). The starting material comprises zinc metal or zinc metal alloy and at least one reactive metal (e.g., the aforementioned at least one other metal referenced in preceding paragraphs).

Referring to FIG. 13, at 1320, the starting material is exposed to one or more alcohols to obtain a reaction product comprising zinc-comprising nanowires. In an aspect, the at least one reactive metal is more reactive than zinc to the one or more alcohols.

Referring to FIG. 13, in some designs, the zinc metal alloy comprises one or more of copper (Cu), aluminum (Al), magnesium (Mg), nickel (Ni), and titanium (Ti).

Referring to FIG. 13, in some designs, the reaction product additionally comprises a residual liquid comprising the at least one reactive metal and the one or more alcohols. In an aspect, the zinc-comprising nanowires may optionally be separated from the residual liquid. In a further aspect, the zinc-comprising nanowires may optionally be chemically reduced by exposing the zinc-comprising nanowires to a chemically reducing environment. For example, the chemically reducing environment may comprise a gaseous or liquid environment comprising a chemically reducing agent). In an aspect, the chemically reducing agent is selected from lithium aluminium hydride ($LiAlH_4$), sodium bis(2-methoxyethoxy)aluminium hydride ($NaAlH_2(OCH_2CH_2OCH_3)_2$), hydrogen, lithium borohydride ($LiBH_4$), sodium borohydride ($NaBH_4$), iron sulfate, or a combination thereof.

Referring to FIG. 13, in some designs, the at least one reactive metal comprises Li. In some designs, the starting material comprises zinc at a given atomic fraction, and the given atomic fraction is selected to be below about 50 at. %. In some designs, the one or more alcohols are selected from 1-propanol ($C_3H_7OH$), 2-propanol ($C_3H_7OH$), or a combination thereof.

Referring to FIG. 13, in some designs, the exposing of the starting material to the one or more alcohols is conducted under a given pressure, and the given pressure is in the range from about 0.1 atm. to about 20 atm. In some designs, the (b) exposing of the starting material to the one or more alcohols is conducted under a given temperature, and the given temperature is in the range from about 0° C. to about 100° C.

Referring to FIG. 13, in some designs, the zinc-comprising nanowires comprise zinc metal nanowires or zinc metal alloy nanowires or a combination thereof. In some designs, the zinc-comprising nanowires comprise zinc ceramic nanowires. In some designs, the zinc-comprising nanowires comprise nanowires comprising zinc alkoxide (i.e., zinc alkoxide-comprising nanowires). For example, the zinc alkoxide-comprising nanowires comprise zinc propoxide nanowires and/or zinc isopropoxide nanowires.

Referring to FIG. 13, in some designs, the zinc-comprising nanowires comprise a porous zinc-comprising nanowire. In some designs, a specific surface area of the porous zinc-comprising nanowire is in the range from about 5 to about 500 m$^2$/g.

Referring to FIG. 13, in some designs, an aspect ratio of at least one of the zinc-comprising nanowires is in the range from about 1:10 to about 1:100,000.

In some designs, the process 1300 of FIG. 13 may be used to produce a plurality of porous zinc-comprising nanowires, which may be made part of a device (e.g., wearable electronics, biomedical devices, lithium-ion batteries, other energy storage devices, etc.). In an aspect, a specific surface area of at least one of the porous zinc-comprising nanowires is in the range from about 5 to about 500 m$^2$/g, and an aspect ratio of at least one of the zinc-comprising nanowires is in the range from about 1:10 to about 1:100,000. In an aspect, the porous zinc-comprising nanowires comprise zinc alkoxide-comprising nanowires.

EXPERIMENTAL DETAILS

Fabrication of Li—Zn alloy Example

The entire alloy fabrication was conducted in an Ar-filled glove box maintained at a low oxygen (<5 ppm) and water (<1 ppm) levels. Battery-grade Li stripe with thickness of 0.75 mm (Sigma Aldrich, USA) and high-purity Zn powders (20-30 mesh, 99.9% purity, Sigma Aldrich) were used as raw materials for the fabrication of Zn—Li alloys. Crushed Li stripes were mixed with a Zn powder in a graphite crucible to attain Li weight fractions of 15, 20, 30 and 50 wt. % (corresponding to $Zn_{0.4}Li_{0.6}$, $Zn_{0.3}Li_{0.7}$, $Zn_{0.2}Li_{0.8}$ and $Zn_{0.1}Li_{0.9}$). The crucible containing Zn and Li metals was placed inside a muffle furnace (KSL-1100, MTI) preheated to 700° C., and kept at that temperature for ~10 min. During this period, both metals melted and mixed with each other homogeneously through diffusion. Subsequently, the crucible containing the molten sample was taken out from the furnace and flattened on steel plates and allowed to cool under Ar environment (cooling rate of ~150° C./min) to obtain the Zn—Li alloy in the form of a pellet.

Illustrative Example of Delithiation of Zn—Li Alloy to Zn-Alkoxide NWs

For delithiation, the as-synthesized Zn—Li pellets (0.3 g) were placed into a vial containing 20 mL of anhydrous protic solvent such as methanol, ethanol, and isopropanol (Sigma Aldrich, 99.5% pure, water content <0.5%). The setup was kept undisturbed (without stirring/agitation) for a designated time at a specific temperature in an Ar-filled glovebox. Immediately upon immersion of the alloy into isopropanol, a rapid evolution of H$_2$ gas was observed by naked eye (with concomitant formation of Li-isopropoxide). As time progressed, the rate of H$_2$ evolution decreased, and after 10 h, one could barely notice any evolution of gases, suggesting a near completion of the reaction. During the process, the pellets gradually became converted into a swollen sponge-like material comprising NWs bundles. As the bulk materials continued to react, the bundles got split into thinner NWs after 24 h, resulting in the formation of a hazy suspension of NWs that settled at the bottom with a clean supernatant solution (FIG. 1(*a*)). After about 48 h, the supernatant solution was decanted to remove the soluble Li-alkoxides. To further purify the NWs from the soluble Li-alkoxides, the mixture was diluted with the same anhydrous solvent and centrifuged. As will be demonstrated in this manuscript, a mixture of Zn and Zn-alkoxide NWs were obtained as a suspension in the anhydrous solvent. Removal of the solvent under vacuum at room temperature afforded the dry hybrid NWs.

Example Synthesis of Zn NWs

The as-synthesized hybrid Zn and Zn-alkoxide NWs were placed in a tube furnace under a flow of H$_2$—Ar (4 vol. % H$_2$ in Ar) and annealed. The heating was ramped from 150° C. to 400° C. at a ramp rate of 1° C./min, and then the furnace was maintained at designated temperature for 1 h, as depicted in FIGS. 11(*a*)-(*b*). FIGS. 11(*a*)-(*b*) illustrate[[s]] XRD patterns and SEM morphology, respectively, of NWs after annealing at 400° C. for 1 h in H$_2$—Ar. Under these conditions, the mixed Zn and Zn-alkoxide NWs converted into pure Zn NWs. Subsequently, the furnace was cooled down to room temperature and the sample was immediately transferred inside glovebox for further use.

Example Materials Characterizations

Hitachi SU8010 and SU8230 scanning electron microscopes (SEMs, Japan) equipped with an Oxford Instruments Aztec energy dispersive X-ray detector (EDX, UK) were used to image and analyze all the produced microstructures. The phase constitutions and crystal structures were identified by X-ray diffractometer using Cu Kα radiation (X0 PERT-PROMPDT, Netherlands). Thermogravimetric analysis (TGA) and differential scanning calorimeter (DSC) were conducted on a TGA Q600 analyzer and DSC Q200 analyzer (TA Instruments, USA), respectively, under N$_2$ atmosphere at a heating rate of 5° C. min$^{-1}$. Fourier Transformed Infrared Spectroscopy (FTIR) was performed with a Thermo Scientific Nicolet iS50 (USA) instrument with an optical velocity of 0.6329 cm s$^{-1}$ and a resolution of 4 cm$^{-1}$. X-ray photoelectron spectroscopy (XPS) was carried out using a K-Alpha system (Cu Kα peak) to identify the chemical composition and valence states (XPS, Kratos Analytical Ltd., UK). To observe the morphology and grain-size of as-fabricated Zn—Li alloy, the sample was further etched in a solution comprising 37 wt. % hydrochloric acid and anhydrous ethanol (5:95 v/v). The image pro plus 6.0 software (USA) was used to estimate the mean diameter of Zn NWs.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of zinc-comprising nanowire fabrication, the method comprising: (a) providing a starting material comprising zinc metal or zinc metal alloy and at least one reactive metal; and (b) exposing the starting material to one or more alcohols to obtain a reaction product comprising zinc-comprising nanowires, wherein the at least one reactive metal is more reactive than zinc to the one or more alcohols.

Clause 2. The method of clause 1, wherein: the zinc metal alloy comprises one or more of copper (Cu), aluminum (Al), magnesium (Mg), nickel (Ni), and titanium (Ti).

Clause 3. The method of any of clauses 1 to 2, wherein: the reaction product additionally comprises a residual liquid comprising the at least one reactive metal and the one or more alcohols; and the method additionally comprises: (c) separating the zinc-comprising nanowires from the residual liquid.

Clause 4. The method of clause 3, further comprising: (d) chemically reducing the zinc-comprising nanowires by exposing the zinc-comprising nanowires to a chemically reducing environment.

Clause 5. The method of clause 4, wherein: the chemically reducing environment comprises a gaseous or liquid environment comprising a chemically reducing agent.

Clause 6. The method of clause 5, wherein the chemically reducing agent is selected from lithium aluminium hydride ($LiAlH_4$), sodium bis(2-methoxyethoxy)aluminium hydride ($NaAlH_2(OCH_2CH_2OCH_3)_2$), hydrogen, lithium borohydride ($LiBH_4$), sodium borohydride ($NaBH_4$), iron sulfate, or a combination thereof.

Clause 7. The method of any of clauses 1 to 6, wherein the at least one reactive metal comprises Li.

Clause 8. The method of any of clauses 1 to 7, wherein the starting material comprises zinc at a given atomic fraction, and the given atomic fraction is selected to be below about 50 at. %.

Clause 9. The method of any of clauses 1 to 8, wherein the one or more alcohols are selected from 1-propanol ($C_3H_7OH$), 2-propanol ($C_3H_7OH$), or a combination thereof.

Clause 10. The method of any of clauses 1 to 9, wherein the (b) exposing of the starting material to the one or more alcohols is conducted under a given pressure, and the given pressure is in a range from about 0.1 atm. to about 20 atm.

Clause 11. The method of any of clauses 1 to 10, wherein the (b) exposing of the starting material to the one or more alcohols is conducted under a given temperature, and the given temperature is in a range from about 0° C. to about 100° C.

Clause 12. The method of any of clauses 1 to 11, wherein the zinc-comprising nanowires comprise zinc metal nanowires or zinc metal alloy nanowires or a combination thereof.

Clause 13. The method of any of clauses 1 to 12, wherein the zinc-comprising nanowires comprise zinc ceramic nanowires.

Clause 14. The method of any of clauses 1 to 13, wherein: the zinc-comprising nanowires comprise nanowires comprising zinc alkoxide.

Clause 15. The method of clause 14, wherein: the zinc alkoxide-comprising nanowires comprise zinc propoxide nanowires and/or zinc isopropoxide nanowires.

Clause 16. The method of any of clauses 1 to 15, wherein the zinc-comprising nanowires comprise a porous zinc-comprising nanowire.

Clause 17. The method of clause 16, wherein a specific surface area of the porous zinc-comprising nanowire is in a range from about 5 to about 500 $m^2/g$.

Clause 18. The method of any of clauses 1 to 17, wherein an aspect ratio of at least one of the zinc-comprising nanowires is in a range from about 1:10 to about 1:100,000.

Clause 19. A device, comprising: a plurality of porous zinc-comprising nanowires, wherein: a specific surface area of at least one of the porous zinc-comprising nanowires is in a range from about 5 to about 500 $m^2/g$; and an aspect ratio of at least one of the zinc-comprising nanowires is in a range from about 1:10 to about 1:100,000.

Clause 20. The device of clause 19, wherein: the porous zinc-comprising nanowires comprise zinc alkoxide-comprising nanowires.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method of zinc-comprising nanowire fabrication, the method comprising:
   (a) providing a starting material comprising zinc metal or zinc metal alloy and at least one reactive metal; and
   (b) exposing the starting material to one or more alcohols to obtain a reaction product comprising zinc-comprising nanowires,
   wherein the at least one reactive metal is more reactive than zinc to the one or more alcohols, and
   wherein the starting material comprises zinc at an atomic fraction of about 10 at. % or greater and less than 100 at. %.

2. The method of claim 1, wherein:
   the zinc metal alloy comprises one or more of copper (Cu), aluminum (Al), magnesium (Mg), nickel (Ni), and titanium (Ti).

3. The method of claim 1, wherein:
   the reaction product additionally comprises a residual liquid comprising the at least one reactive metal and the one or more alcohols; and
   the method additionally comprises:
   (c) separating the zinc-comprising nanowires from the residual liquid.

4. The method of claim 1, wherein the at least one reactive metal comprises Li.

5. The method of claim 1, wherein the atomic fraction is selected to be below about 50 at. %.

6. The method of claim 1, wherein the one or more alcohols are selected from 1-propanol ($C_3H_7OH$), 2-propanol ($C_3H_7OH$), or a combination thereof.

7. The method of claim 1, wherein the (b) exposing of the starting material to the one or more alcohols is conducted under a given pressure, and the given pressure is in a range from about 0.1 atm. to about 20 atm.

8. The method of claim 1, wherein the (b) exposing of the starting material to the one or more alcohols is conducted under a given temperature, and the given temperature is in a range from about 0° C. to about 100° C.

9. The method of claim 1, wherein the zinc-comprising nanowires comprise zinc metal nanowires or zinc metal alloy nanowires or a combination thereof.

10. The method of claim 1, wherein the zinc-comprising nanowires comprise zinc ceramic nanowires.

11. The method of claim 1, wherein:
the zinc-comprising nanowires comprise nanowires comprising zinc alkoxide.

12. The method of claim 11, wherein:
the zinc alkoxide-comprising nanowires comprise zinc propoxide nanowires and/or zinc isopropoxide nanowires.

13. The method of claim 1, wherein the zinc-comprising nanowires comprise a porous zinc-comprising nanowire.

14. The method of claim 13, wherein a specific surface area of the porous zinc-comprising nanowire is in a range from about 5 to about 500 m²/g.

15. The method of claim 1, wherein an aspect ratio of at least one of the zinc- comprising nanowires is in a range from about 1:10 to about 1:100,000.

16. The method of claim 1, wherein:
the atomic fraction is selected to be below about 80 at. %.

17. A method of zinc-comprising nanowire fabrication, the method comprising:

(a) providing a starting material comprising zinc metal or zinc metal alloy and at least one reactive metal;

(b) exposing the starting material to one or more alcohols to obtain a reaction product comprising zinc-comprising nanowires and a residual liquid comprising the at least one reactive metal and the one or more alcohols;

(c) separating the zinc-comprising nanowires from the residual liquid; and (d) chemically reducing the zinc-comprising nanowires by exposing the zinc-comprising nanowires to a chemically reducing environment, wherein the at least one reactive metal is more reactive than zinc to the one or more alcohols.

18. The method of claim 17, wherein:
the chemically reducing environment comprises a gaseous or liquid environment comprising a chemically reducing agent.

19. The method of claim 18, wherein the chemically reducing agent is selected from lithium aluminum hydride (LiAlH$_4$), sodium bis(2-methoxyethoxy) aluminum hydride (NaAlH$_2$(OCH$_2$CH$_2$OCH$_3$)$_2$), hydrogen, lithium borohydride (LiBH$_4$), sodium borohydride (NaBH$_4$), iron sulfate, or a combination thereof.

* * * * *